(12) United States Patent
Solbach

(10) Patent No.: US 8,204,253 B1
(45) Date of Patent: Jun. 19, 2012

(54) SELF CALIBRATION OF AUDIO DEVICE

(75) Inventor: Ludger Solbach, Mountain View, CA (US)

(73) Assignee: Audience, Inc., Mountain View, CA (US)

( * ) Notice: Subject to any disclaimer, the term of this patent is extended or adjusted under 35 U.S.C. 154(b) by 827 days.

(21) Appl. No.: 12/286,909

(22) Filed: Oct. 2, 2008

Related U.S. Application Data

(63) Continuation-in-part of application No. 12/215,980, filed on Jun. 30, 2008.

(51) Int. Cl.
*H04B 15/00* (2006.01)
*G10L 21/02* (2006.01)

(52) U.S. Cl. ........................ 381/94.7; 704/226

(58) Field of Classification Search ........ 381/94.1–94.3, 381/92, 97, 98, 66, 94.7; 704/226, 225, 233
See application file for complete search history.

(56) References Cited

U.S. PATENT DOCUMENTS

| | | |
|---|---|---|
| 3,976,863 A | 8/1976 | Engel |
| 3,978,287 A | 8/1976 | Fletcher et al. |
| 4,137,510 A | 1/1979 | Iwahara |
| 4,433,604 A | 2/1984 | Ott |
| 4,516,259 A | 5/1985 | Yato et al. |
| 4,535,473 A | 8/1985 | Sakata |
| 4,536,844 A | 8/1985 | Lyon |
| 4,581,758 A | 4/1986 | Coker et al. |
| 4,628,529 A | 12/1986 | Borth et al. |
| 4,630,304 A | 12/1986 | Borth et al. |
| 4,649,505 A | 3/1987 | Zinser, Jr. et al. |
| 4,658,426 A | 4/1987 | Chabries et al. |
| 4,674,125 A | 6/1987 | Carlson et al. |
| 4,718,104 A | 1/1988 | Anderson |
| 4,811,404 A | 3/1989 | Vilmur et al. |
| 4,812,996 A | 3/1989 | Stubbs |
| 4,864,620 A | 9/1989 | Bialick |

(Continued)

FOREIGN PATENT DOCUMENTS

JP 62110349 5/1987

(Continued)

OTHER PUBLICATIONS

Boll, Steven "Supression of Acoustic Noise in Speech using Spectral Subtraction", source(s): IEEE Transactions on Acoustics, Speech and Signal Processing, vol. ASSP-27, No. 2, Apr. 1979, pp. 113-120.

(Continued)

*Primary Examiner* — Ping Lee
(74) *Attorney, Agent, or Firm* — Carr & Ferrell LLP

(57) ABSTRACT

An audio device performs self calibration with respect to an audio source location when processing an audio signal frame determined likely to be dominated by the audio source. One or more conditions for sub-bands within the audio frame are evaluated to help identify whether the frame is dominated by the audio source. If the conditions meet a threshold value for a number of sub-bands within the frame, the audio signal may be identified as one dominated by the desired audio source and an audio source location coefficient may be adapted. Additionally, when the audio source location coefficient falls below a threshold value, (e.g., suggesting that one of two or more microphones is blocked), noise suppression is reduced or eliminated for the frame or frame sub-bands to prevent suppression of a desired audio source component along with the noise component.

20 Claims, 11 Drawing Sheets

U.S. PATENT DOCUMENTS

| | | |
|---|---|---|
| 4,920,508 A | 4/1990 | Yassaie et al. |
| 5,027,410 A | 6/1991 | Williamson et al. |
| 5,054,085 A | 10/1991 | Meisel et al. |
| 5,058,419 A | 10/1991 | Nordstrom et al. |
| 5,099,738 A | 3/1992 | Hotz |
| 5,119,711 A | 6/1992 | Bell et al. |
| 5,142,961 A | 9/1992 | Paroutaud |
| 5,150,413 A | 9/1992 | Nakatani et al. |
| 5,175,769 A | 12/1992 | Hejna, Jr. et al. |
| 5,187,776 A | 2/1993 | Yanker |
| 5,208,864 A | 5/1993 | Kaneda |
| 5,210,366 A | 5/1993 | Sykes, Jr. |
| 5,224,170 A | 6/1993 | Waite, Jr. |
| 5,230,022 A | 7/1993 | Sakata |
| 5,319,736 A | 6/1994 | Hunt |
| 5,323,459 A | 6/1994 | Hirano |
| 5,341,432 A | 8/1994 | Suzuki et al. |
| 5,381,473 A | 1/1995 | Andrea et al. |
| 5,381,512 A | 1/1995 | Holton et al. |
| 5,400,409 A | 3/1995 | Linhard |
| 5,402,493 A | 3/1995 | Goldstein |
| 5,402,496 A | 3/1995 | Soli et al. |
| 5,471,195 A | 11/1995 | Rickman |
| 5,473,702 A | 12/1995 | Yoshida et al. |
| 5,473,759 A | 12/1995 | Slaney et al. |
| 5,479,564 A | 12/1995 | Vogten et al. |
| 5,502,663 A | 3/1996 | Lyon |
| 5,536,844 A | 7/1996 | Wijesekera |
| 5,544,250 A | 8/1996 | Urbanski |
| 5,574,824 A | 11/1996 | Slyh et al. |
| 5,583,784 A | 12/1996 | Kapust et al. |
| 5,587,998 A | 12/1996 | Velardo, Jr. et al. |
| 5,590,241 A | 12/1996 | Park et al. |
| 5,602,962 A | 2/1997 | Kellermann |
| 5,675,778 A | 10/1997 | Jones |
| 5,682,463 A | 10/1997 | Allen et al. |
| 5,694,474 A | 12/1997 | Ngo et al. |
| 5,706,395 A | 1/1998 | Arslan et al. |
| 5,717,829 A | 2/1998 | Takagi |
| 5,729,612 A | 3/1998 | Abel et al. |
| 5,732,189 A | 3/1998 | Johnston et al. |
| 5,749,064 A | 5/1998 | Pawate et al. |
| 5,757,937 A | 5/1998 | Itoh et al. |
| 5,792,971 A | 8/1998 | Timis et al. |
| 5,796,819 A | 8/1998 | Romesburg |
| 5,806,025 A | 9/1998 | Vis et al. |
| 5,809,463 A | 9/1998 | Gupta et al. |
| 5,825,320 A | 10/1998 | Miyamori et al. |
| 5,839,101 A | 11/1998 | Vahatalo et al. |
| 5,920,840 A | 7/1999 | Satyamurti et al. |
| 5,933,495 A | 8/1999 | Oh |
| 5,943,429 A | 8/1999 | Handel |
| 5,956,674 A | 9/1999 | Smyth et al. |
| 5,974,380 A | 10/1999 | Smyth et al. |
| 5,978,824 A | 11/1999 | Ikeda |
| 5,983,139 A | 11/1999 | Zierhofer |
| 5,990,405 A | 11/1999 | Auten et al. |
| 6,002,776 A | 12/1999 | Bhadkamkar et al. |
| 6,061,456 A | 5/2000 | Andrea et al. |
| 6,072,881 A | 6/2000 | Linder |
| 6,097,820 A | 8/2000 | Turner |
| 6,108,626 A | 8/2000 | Cellario et al. |
| 6,122,610 A | 9/2000 | Isabelle |
| 6,134,524 A | 10/2000 | Peters et al. |
| 6,137,349 A | 10/2000 | Menkhoff et al. |
| 6,140,809 A | 10/2000 | Doi |
| 6,173,255 B1 | 1/2001 | Wilson et al. |
| 6,180,273 B1 | 1/2001 | Okamoto |
| 6,216,103 B1 | 4/2001 | Wu et al. |
| 6,222,927 B1 | 4/2001 | Feng et al. |
| 6,223,090 B1 | 4/2001 | Brungart |
| 6,226,616 B1 | 5/2001 | You et al. |
| 6,263,307 B1 | 7/2001 | Arslan et al. |
| 6,266,633 B1 | 7/2001 | Higgins et al. |
| 6,317,501 B1 | 11/2001 | Matsuo |
| 6,339,758 B1 | 1/2002 | Kanazawa et al. |
| 6,355,869 B1 | 3/2002 | Mitton |
| 6,363,345 B1 | 3/2002 | Marash et al. |
| 6,381,570 B2 | 4/2002 | Li et al. |
| 6,430,295 B1 | 8/2002 | Handel et al. |
| 6,434,417 B1 | 8/2002 | Lovett |
| 6,449,586 B1 | 9/2002 | Hoshuyama |
| 6,469,732 B1 | 10/2002 | Chang et al. |
| 6,487,257 B1 | 11/2002 | Gustafsson et al. |
| 6,496,795 B1 | 12/2002 | Malvar |
| 6,513,004 B1 | 1/2003 | Rigazio et al. |
| 6,516,066 B2 | 2/2003 | Hayashi |
| 6,529,606 B1 | 3/2003 | Jackson, Jr. II et al. |
| 6,549,630 B1 | 4/2003 | Bobisuthi |
| 6,584,203 B2 | 6/2003 | Elko et al. |
| 6,622,030 B1 | 9/2003 | Romesburg et al. |
| 6,717,991 B1 | 4/2004 | Gustafsson et al. |
| 6,718,309 B1 | 4/2004 | Selly |
| 6,738,482 B1 | 5/2004 | Jaber |
| 6,760,450 B2 | 7/2004 | Matsuo |
| 6,785,381 B2 | 8/2004 | Gartner et al. |
| 6,792,118 B2 | 9/2004 | Watts |
| 6,795,558 B2 | 9/2004 | Matsuo |
| 6,798,886 B1 | 9/2004 | Smith et al. |
| 6,810,273 B1 | 10/2004 | Mattila et al. |
| 6,882,736 B2 | 4/2005 | Dickel et al. |
| 6,915,264 B2 | 7/2005 | Baumgarte |
| 6,917,688 B2 | 7/2005 | Yu et al. |
| 6,944,510 B1 | 9/2005 | Ballesty et al. |
| 6,978,159 B2 | 12/2005 | Feng et al. |
| 6,982,377 B2 | 1/2006 | Sakurai et al. |
| 6,999,582 B1 | 2/2006 | Popovic et al. |
| 7,016,507 B1 | 3/2006 | Brennan |
| 7,020,605 B2 | 3/2006 | Gao |
| 7,031,478 B2 | 4/2006 | Belt et al. |
| 7,054,452 B2 | 5/2006 | Ukita |
| 7,065,485 B1 | 6/2006 | Chong-White et al. |
| 7,076,315 B1 | 7/2006 | Watts |
| 7,092,529 B2 | 8/2006 | Yu et al. |
| 7,092,882 B2 | 8/2006 | Arrowood et al. |
| 7,099,821 B2 | 8/2006 | Visser et al. |
| 7,142,677 B2 | 11/2006 | Gonopolskiy et al. |
| 7,146,316 B2 | 12/2006 | Alves |
| 7,155,019 B2 | 12/2006 | Hou |
| 7,164,620 B2 | 1/2007 | Hoshuyama |
| 7,171,008 B2 | 1/2007 | Elko |
| 7,171,246 B2 | 1/2007 | Mattila et al. |
| 7,174,022 B1 | 2/2007 | Zhang et al. |
| 7,206,418 B2 | 4/2007 | Yang et al. |
| 7,209,567 B1 | 4/2007 | Kozel et al. |
| 7,225,001 B1 | 5/2007 | Eriksson et al. |
| 7,242,762 B2 | 7/2007 | He et al. |
| 7,246,058 B2 | 7/2007 | Burnett |
| 7,254,242 B2 | 8/2007 | Ise et al. |
| 7,359,520 B2 | 4/2008 | Brennan et al. |
| 7,412,379 B2 | 8/2008 | Taori et al. |
| 7,433,907 B2 | 10/2008 | Nagai et al. |
| 7,555,434 B2 | 6/2009 | Nomura et al. |
| 7,949,522 B2 | 5/2011 | Hetherington et al. |
| 2001/0016020 A1 | 8/2001 | Gustafsson et al. |
| 2001/0031053 A1 | 10/2001 | Feng et al. |
| 2002/0002455 A1 | 1/2002 | Accardi et al. |
| 2002/0009203 A1 | 1/2002 | Erten |
| 2002/0041693 A1 | 4/2002 | Matsuo |
| 2002/0080980 A1 | 6/2002 | Matsuo |
| 2002/0106092 A1 | 8/2002 | Matsuo |
| 2002/0116187 A1 | 8/2002 | Erten |
| 2002/0133334 A1 | 9/2002 | Coorman et al. |
| 2002/0147595 A1 | 10/2002 | Baumgarte |
| 2002/0184013 A1 | 12/2002 | Walker |
| 2003/0014248 A1 | 1/2003 | Vetter |
| 2003/0026437 A1 | 2/2003 | Janse et al. |
| 2003/0033140 A1 | 2/2003 | Taori et al. |
| 2003/0039369 A1 | 2/2003 | Bullen |
| 2003/0040908 A1 | 2/2003 | Yang et al. |
| 2003/0061032 A1 | 3/2003 | Gonopolskiy |
| 2003/0063759 A1 | 4/2003 | Brennan et al. |
| 2003/0072382 A1 | 4/2003 | Raleigh et al. |
| 2003/0072460 A1 | 4/2003 | Gonopolskiy et al. |
| 2003/0095667 A1 | 5/2003 | Watts |
| 2003/0099345 A1 | 5/2003 | Gartner et al. |
| 2003/0101048 A1 | 5/2003 | Liu |

| | | |
|---|---|---|
| 2003/0103632 A1 | 6/2003 | Goubran et al. |
| 2003/0128851 A1 | 7/2003 | Furuta |
| 2003/0138116 A1 | 7/2003 | Jones et al. |
| 2003/0147538 A1 | 8/2003 | Elko |
| 2003/0169891 A1 | 9/2003 | Ryan et al. |
| 2003/0228023 A1 | 12/2003 | Burnett et al. |
| 2004/0013276 A1 | 1/2004 | Ellis et al. |
| 2004/0047464 A1 | 3/2004 | Yu et al. |
| 2004/0057574 A1 | 3/2004 | Faller |
| 2004/0078199 A1 | 4/2004 | Kremer et al. |
| 2004/0131178 A1 | 7/2004 | Shahaf et al. |
| 2004/0133421 A1 | 7/2004 | Burnett et al. |
| 2004/0165736 A1 | 8/2004 | Hetherington et al. |
| 2004/0196989 A1 | 10/2004 | Friedman et al. |
| 2004/0263636 A1 | 12/2004 | Cutler et al. |
| 2005/0025263 A1 | 2/2005 | Wu |
| 2005/0027520 A1 | 2/2005 | Mattila et al. |
| 2005/0049864 A1 | 3/2005 | Kaltenmeier et al. |
| 2005/0060142 A1 | 3/2005 | Visser et al. |
| 2005/0152559 A1 | 7/2005 | Gierl et al. |
| 2005/0185813 A1 | 8/2005 | Sinclair et al. |
| 2005/0213778 A1 | 9/2005 | Buck et al. |
| 2005/0216259 A1 | 9/2005 | Watts |
| 2005/0228518 A1 | 10/2005 | Watts |
| 2005/0276423 A1 | 12/2005 | Aubauer et al. |
| 2005/0288923 A1 | 12/2005 | Kok |
| 2006/0072768 A1 | 4/2006 | Schwartz et al. |
| 2006/0074646 A1 | 4/2006 | Alves et al. |
| 2006/0098809 A1 | 5/2006 | Nongpiur et al. |
| 2006/0120537 A1 | 6/2006 | Burnett et al. |
| 2006/0133621 A1 | 6/2006 | Chen et al. |
| 2006/0149535 A1 | 7/2006 | Choi et al. |
| 2006/0184363 A1 | 8/2006 | McCree et al. |
| 2006/0198542 A1 | 9/2006 | Benjelloun Touimi et al. |
| 2006/0222184 A1 | 10/2006 | Buck et al. |
| 2007/0021958 A1 | 1/2007 | Visser et al. |
| 2007/0027685 A1 | 2/2007 | Arakawa et al. |
| 2007/0033020 A1 | 2/2007 | (Kelleher) Francois et al. |
| 2007/0067166 A1 | 3/2007 | Pan et al. |
| 2007/0078649 A1 | 4/2007 | Hetherington et al. |
| 2007/0094031 A1 | 4/2007 | Chen |
| 2007/0100612 A1 | 5/2007 | Ekstrand et al. |
| 2007/0116300 A1 | 5/2007 | Chen |
| 2007/0150268 A1 | 6/2007 | Acero et al. |
| 2007/0154031 A1 | 7/2007 | Avendano et al. |
| 2007/0165879 A1 | 7/2007 | Deng et al. |
| 2007/0195968 A1 | 8/2007 | Jaber |
| 2007/0230712 A1* | 10/2007 | Belt et al. .................. 381/71.1 |
| 2007/0276656 A1 | 11/2007 | Solbach et al. |
| 2008/0019548 A1 | 1/2008 | Avendano |
| 2008/0033723 A1 | 2/2008 | Jang et al. |
| 2008/0140391 A1 | 6/2008 | Yen et al. |
| 2008/0201138 A1 | 8/2008 | Visser et al. |
| 2008/0228478 A1 | 9/2008 | Hetherington et al. |
| 2008/0260175 A1 | 10/2008 | Elko |
| 2009/0012783 A1 | 1/2009 | Klein |
| 2009/0012786 A1 | 1/2009 | Zhang et al. |
| 2009/0129610 A1 | 5/2009 | Kim et al. |
| 2009/0220107 A1 | 9/2009 | Every et al. |
| 2009/0238373 A1 | 9/2009 | Klein |
| 2009/0253418 A1 | 10/2009 | Makinen |
| 2009/0271187 A1 | 10/2009 | Yen et al. |
| 2009/0323982 A1 | 12/2009 | Solbach et al. |
| 2010/0094643 A1 | 4/2010 | Avendano et al. |
| 2010/0278352 A1 | 11/2010 | Petit et al. |
| 2011/0178800 A1 | 7/2011 | Watts |

FOREIGN PATENT DOCUMENTS

| | | |
|---|---|---|
| JP | 04184400 | 7/1992 |
| JP | 4184400 | 7/1992 |
| JP | 5053587 | 3/1993 |
| JP | 05-172865 | 7/1993 |
| JP | 06269083 | 9/1994 |
| JP | 6269083 | 9/1994 |
| JP | 10-313497 | 11/1998 |
| JP | 11-249693 | 9/1999 |
| JP | 2004053895 | 2/2004 |
| JP | 2004531767 | 10/2004 |
| JP | 2004533155 | 10/2004 |
| JP | 2005110127 | 4/2005 |
| JP | 2005148274 | 6/2005 |
| JP | 2005518118 | 6/2005 |
| JP | 2005195955 | 7/2005 |
| WO | 01/74118 | 10/2001 |
| WO | 02080362 | 10/2002 |
| WO | 02103676 | 12/2002 |
| WO | 03/043374 | 5/2003 |
| WO | 03/069499 | 8/2003 |
| WO | 03069499 | 8/2003 |
| WO | 2004/010415 | 1/2004 |
| WO | 2007/081916 | 7/2007 |
| WO | 2007/014003 | 12/2007 |
| WO | 2010/005493 | 1/2010 |

OTHER PUBLICATIONS

Dahl et al., "Simultaneous Echo Cancellation and Car Noise Suppression Employing a Microphone Array", source(s): IEEE, 1997, pp. 239-382.

"Ent 172." Instructional Module. Prince George's Community College Department of Engineering Technology. Accessed: Oct. 15, 2011. Subsection: "Polar and Rectangular Notation". <http://academic.ppgcc.edu/ent/ent172_instr_mod.html>.

Fulghum et al., "LPC Voice Digitizer with Background Noise Suppression", source(s): IEEE, 1979, pp. 220-223.

Graupe et al., "Blind Adaptive Filtering of Speech form Noise of Unknown Spectrum Using Virtual Feedback Configuration", source(s): IEEE, 2000, pp. 146-158.

Haykin, Simon et al. "Appendix A.2 Complex Numbers." Signals and Systems. @nd ed. 2003. p. 764.

Hermansky, Hynek "Should Recognizers Have Ears?", In Proc. ESCA Tutorial and Research Workshop on Robust Speech Recognition for Unknown Communication Channels, pp. 1-10, France 1997.

Hohmann, V. "Frequency Analysis and Synthesis Using a Gammatone Filterbank", ACTA Acustica United with Acustica, 2002, vol. 88, pp. 433-442.

Jeffress, "A Place Theory of Sound Localization," The Journal of Comparative and Physiological Psychology, 1948, vol. 41, p. 35-39.

Jeong, Hyuk et al., "Implementation of a New Algorithm Using the STFT with Variable Frequency Resolution for the Time-Frequency Auditory Model", J. Audio Eng. Soc., Apr. 1999, vol. 47, No. 4., pp. 240-251.

Kates, James M. "A Time Domain Digital Cochlear Model", IEEE Transactions on Signal Proccessing, Dec. 1991, vol. 39, No. 12, pp. 2573-2592.

Lazzaro et al., "A Silicon Model of Auditory Localization," Neural Computation 1, 47-57, 1989, Massachusetts Institute of Technology.

Lippmann, Richard P. "Speech Recognition by Machines and Humans", Speech Communication 22(1997) 1-15, 1997 Elsevier Science B.V.

Martin, R "Spectral subtraction based on minimum statistics," in Proc. Eur. Signal Processing Conf., 1994, pp. 1182-1185.

Mitra, Sanjit K. Digital Signal Processing: a Computer-based Approach. 2nd ed. 2001. pp. 131-133.

Narrative of Prior Disclosure of Audio Display, Feb. 15, 2000, 4 pages.

Cosi, P. et al (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.

Rabiner, Lawrence R. et al. Digital Processing of Speech Signals (Prentice-Hall Series in Signal Processing). Upper Saddle River, NJ: Prentice Hall, 1978.

Weiss, Ron et al, Estimating single-channel source separation masks:revelance vector machine classifiers vs. pitch-based masking. Workshop on Statistical and Preceptual Audio Processing, 2006.

Schimmel, Steven et al., "Coherent Envelope Detection for Modulation Filtering of Speech," ICASSP 2005,I-221-1224, 2005 IEEE.

Slaney, Malcom, "Lyon's Cochlear Model", Advanced Technology Group, Apple Technical Report #13, Apple Computer, Inc., 1988, pp. 1-79.

Slaney, Malcom, et al. (1994). "Auditory model inversion for sound separation," Proc. of IEEE Intl. Conf. on Acous., Speech and Sig. Proc., Sydney, vol. II, 77-80.

Slaney, Malcom. "An Introduction to Auditory Model Inversion," Interval Technical Report IRC 1994-014, http://coweb.ecn.purdue.edu/~maclom/interval/1994-014/,Sep. 1994, 7 pages.

Solbach, Ludger "An Architecture for Robust Partial Tracking and Onset Localization in Single Channel Audio Signal Mixes", Tuhn Technical University, Hamburg and Harburg, ti6 Verteilte Systeme, 1998.

Syntrillium Software Corporation, "Cool Edit User's Manual, " 1996, pp. 1-74.

Tchorz et al., "SNR Estimation Based on Amplitude Modulation Analysis with Applications to Noise Suppression", source(s): IEEE Transactions on Speech and Audio Processing, vol. 11, No. 3, May 2003, pp. 184-192.

Watts, "Robust Hearing Systems for Intelligent Machines," Applied Neurosystems Corporation, 2001, pp. 1-5.

Yoo et al., "Continuous-Time Audio Noise Suppression and Real-Time Implementation", source(s): IEEE, 2002, pp. IV3980-IV3983.

International Search Report dated Jun. 8, 2001 in Application No. PCT/US01/08372.

International Search Report dated Apr. 3, 2003 in Application No. PCT/US02/36946.

International Search Report dated May 29, 2003 in Application No. PCT/US03/04124.

International Search Report and Written Opinion dated Sep. 16, 2008 in Application No. PCT/US07/12628.

International Search Report and Written Opinion dated May 11, 2009 in Application No. PCT/US09/01667.

International Search Report and Written Opinion dated May 20, 2010 in Application No. PCT/US09106754.

US Reg. No. 2,875,755 (Aug. 17, 2004).

Avendano, C., "Frequency-Domain Techniques for Source Identification and Manipulation in Stereo Mixes for Enhancement, Suppression and Re-Panning Applications," in Proc. IEEE Workshop on Application of Signal Processing to Audio and Acoustics, Waspaa, 03, New Paltz, NY, 2003.

Elko, Gary W., "Differential Microphone Arrays, "Audio Signal Processing for Next-Generation Multimedia Communication Systems, 2004, pp. 12-65, Kluwer Academic Publishers, Norwell, Massachusetts, USA.

B. Widrow et al., "Adaptive Antenna Systems," Proceedings IEEE, vol. 55, No. 12, pp. 2143-2159, Dec. 1967.

Allen, Jont B. "Short Term Spectral Analysis, and Modification by Discrete Fourier Transform", IEEE Transactions on Acoustics, Speech, and Signal Processing. vol ASSP-25, 3. Jun. 1977. pp. 235-238.

Allen, Jont B. et al. "A Unified Approach to Short-Time Fourier Analysis and Synthesis", Proceedings of the IEEE. vol. 65, Nov. 11, 1977. pp. 1558-1564.

Boll, Steven F. "Suppression of Acoustic Noise in Speech Using Spectral Subtraction", Dept. of Computer Science, University of Utah Salt Lake City, Utah, Apr. 1979, pp. 18-19.

Boll, Steven et al. "Suppression of Acoustic Noise in Speech Using Two Microphone Adaptive Noise Cancellation", source(s): IEEE Transactions on Acoustic, Speech, and Signal Processing. vol. v ASSP-28, n 6, Dec. 1980, pp. 752-753.

Chen, Jingdong et al. "New Insights into the Noise Reduction Wierner Filter", source(s): IEEE Transactions on Audio, Speech, and Language Processing. vol. 14, 4, Jul. 2006, pp. 1218-1234.

Cohen, Isreal, "Mutichannel Post-Filtering in Nonstationary Noise Environment", source(s): IEEE Transactions on Signal Processing. vol. 52, May 5, 2004, pp. 1149-1160.

Cohen et al. "Microphone Array Post-Filtering for Non-Stationary Noise", source(s): IEEE, May 2002.

Fuchs, Martin et al. "Noise Suppression for Automotive Applications Based on Directional Information", source(s): 2004 IEEE. pp. 237-240.

Goubran, R.A.. "Acoustic Noise Suppression Using Regression Adaptive Filtering", source(s): 1990 IEEE. pp. 48-53.

Liu, Chen et al. "A two-microphone dual delay-line approach for extraction of a speech sound in the pressence of multiple interferers", source(s): Acoustical Society of America. vol. 110, Dec. 6, 2001, pp. 3218-3231.

Martin, Rainer et al. "Combined Acoustic Echo Cancellation, Derverberation and Noise Reduction: A two Microphone Approach", source(s): Annles des Telecommunications/Annals of Telecommunications. vol. 29, 7-8, Jul.-Aug. 1994, pp. 429-438.

Mizumachi, Mitsunori et al. "Noise Reduction by Paired-Microphones Using Spectral Subtraction", source(s): 1998 IEEE. pp. 1001-1004.

Moonen, Marc et at. "Multi-Microphone Signal Enhancement Techniques for Noise Suppression and Dereverbration," source(s): http://www.esat.kuleuven.ac.be/sista/yearreport97//node37.html.

Parra, Lucas et al. "Convolutive blind Separation of Non-Stationary", source(s): IEEE Transactions on Speech and Audio Processing. vol. 8, May 3, 2008, pp. 320-327.

Tashev, Ivan et al. "Microphone Array of Headset with Spatial Noise Suppressor", source(s): http://research.microsoft.com/users/ivantash/Documents/Tashev_MAforHeadset_HSCMA_05.pdf. (4 pages).

Valin, Jean-Marc et al. "Enhanced Robot Audition Based on Micophone Array Source Separation with Post-Filter", source(s): Proceedings of 2004 IEEE/RSJ International Conference on Intelligent Robots and Systems, Sep. 28-Oct. 2, 2004, Sendai, Japan. pp. 2123-2128.

Stahl, V.; Fischer, A.; Bippus, R.; "Quantile based noise estimation for spectral subtraction and Wiener filtering," Acoustics, Speech, and Signal Processing, 2000. ICASSP '00. Proceedings. 2000 IEEE International Conference on, vol. 3, no., pp. 1875-1878 vol. 3, 2000.

International Search Report and Written Opinion dated Aug. 27, 2009 in Application No. PCT/US09/03813.

International Search Report and Written Opinion dated Oct. 19, 2007 in Application No. PCT/US07/00463.

International Search Report and Written Opinion dated Oct. 1, 2008 in Application No. PCT/US08/08249.

International Search Report and Written Opinion dated Apr. 9, 2008 in Application No. PCT/US07/21654.

Dahl, Mattias et al., "Acoustic Echo and Noise Cancelling Using Microphone Arrays", International Symposium on Signal Processing and its Applications, ISSPA, Gold coast, Australia, Aug. 25-30, 1996, pp. 379-382.

Demol, M. et al. "Efficient Non-Uniform Time-Scaling of Speech With WSOLA for CALL Applications", Proceedings of InSTIL/ICALL2004—NLP and Speech Technologies in Advanced Language Learning Systems—Venice Jun. 17-19, 2004.

Laroche, Jean. "Time and Pitch Scale Modification of Audio Signals", in "Applications of Digital Signal Processing to Audio and Acoustics", The Kluwer International Series in Engineering and Computer Science, vol. 437, pp. 279-309, 2002.

Moulines, Eric et al., "Non-Parametric Techniques for Pitch-Scale and Time-Scale Modification of Speech", Speech Communication, vol. 16, pp. 175-205, 1995.

Verhelst, Werner, "Overlap-Add Methods for Time-Scaling of Speech", Speech Communication vol. 30, pp. 207-221, 2000.

\* cited by examiner

SELF CALIBRATION OF AUDIO DEVICE

CROSS-REFERENCE TO RELATED APPLICATION

This application is a continuation-in-part of U.S. patent application Ser. No. 12/215,980, filed Jun. 30, 2008, entitled "System and Method for Providing Noise Suppression Utilizing Null Processing Noise Subtraction", which is incorporated herein by reference. Additionally, the present application is related to U.S. patent application Ser. No. 12/286,995, filed Oct. 2, 2008, entitled "System and Method for Controlling Adaptivity for Signal Modification Using a Phantom Coefficient," which is incorporated herein by reference.

BACKGROUND OF THE INVENTION

1. Field of Invention

The present invention relates generally to audio processing and more particularly to adaptive noise suppression of an audio signal.

2. Description of Related Art

Currently, there are many methods for reducing background noise in an adverse audio environment. Some audio devices that suppress noise utilize two or more microphones to receive an audio signal. Each of these microphones is typically fabricated in large numbers according to specified manufacturing tolerances. Because the fabrication manufacturing tolerances allow for minor differences between each microphone, the microphones are not created equally and often have inconsistent performance characteristics.

Microphones with different performance characteristics may not perform consistently over a particular audio spectrum. This difference in microphone performance can create problems in noise suppression processing in audio devices that use the microphones. Manufacturers typically provide calibration data intended to work with the majority of their microphones. However, the provided data often does not result in optimal performance for microphones that are on the outer ends of the manufacturing tolerances.

SUMMARY OF THE INVENTION

Embodiments of the present invention overcome or substantially alleviate prior problems associated with noise suppression and speech enhancement by self calibrating a microphone when processing a frame which is likely dominated by an audio source other than noise. One or more conditions for an audio frame are evaluated to help identify whether the frame is dominated by an audio source. The conditions may include one or more of an energy, magnitude, and phase threshold comparison. If the conditions meet a threshold value for a number of sub-bands of the audio signal, the audio signal may be identified as one dominated by the desired audio source. For audio signal frames dominated by the desired audio source, a $\sigma$ coefficient reflecting a position of a speaker may be adapted.

In exemplary embodiments, at least a primary and a secondary acoustic signal are received by a microphone array. The microphone array may comprise a close microphone array or a spread microphone array. In some embodiments, one or more microphones in an audio device may be blocked during an audio signal frame. When a secondary microphone is blocked, for example, speech may be inadvertently canceled during a noise cancellation process. To prevent speech cancellation due to microphone blockage, a shadow or copy of a $\sigma$ coefficient can be maintained and continuously adapted. If a value of the shadow coefficient falls below a threshold, a corresponding adaption coefficient $\alpha$ is reduced, thereby preventing speech cancellation.

BRIEF DESCRIPTION OF THE DRAWINGS

FIG. 5$b$ is a schematic illustrating the operations of the noise subtraction engine.

DESCRIPTION OF EXEMPLARY EMBODIMENTS

Embodiments of the present invention suppress noise in an audio signal based on adapting a $\sigma$ coefficient associated with a location of an audio signal source. Selective $\sigma$ coefficient adaptation results in self calibrating a microphone when processing a frame likely dominated by an audio source other than noise. The $\sigma$ coefficient is selectively calibrated based on audio signal frames that satisfy one or more conditions, such as for example, signal energy, $\sigma$ coefficient magnitude, and $\sigma$ coefficient thresholds. If an audio signal frame satisfies the conditions for a minimum number of sub-bands in the frame, the $\sigma$ coefficient may be adapted for that frame.

In exemplary embodiments, one or more microphones in an audio device may be blocked during an audio signal frame. When a secondary microphone is blocked, for example, speech may be inadvertently canceled during a noise cancellation process. To prevent speech cancellation due to microphone blockage, a shadow or copy of a $\sigma$ coefficient can be maintained and continuously compared to a threshold. If the shadow coefficient value falls below the threshold, a corresponding adaption coefficient $\alpha$ is reduced, thereby reducing the level of adaption for that frame, preventing noise suppression in the audio signal, and preventing a suppression of desired audio signal.

Embodiments of the present invention may be practiced on any audio device that is configured to receive sound such as, but not limited to, cellular phones, phone handsets, headsets, and conferencing systems. Advantageously, exemplary embodiments are configured to provide improved noise suppression while minimizing speech distortion. While some embodiments of the present invention will be described in reference to operation on a cellular phone, the present invention may be practiced on any audio device.

Figure 1:
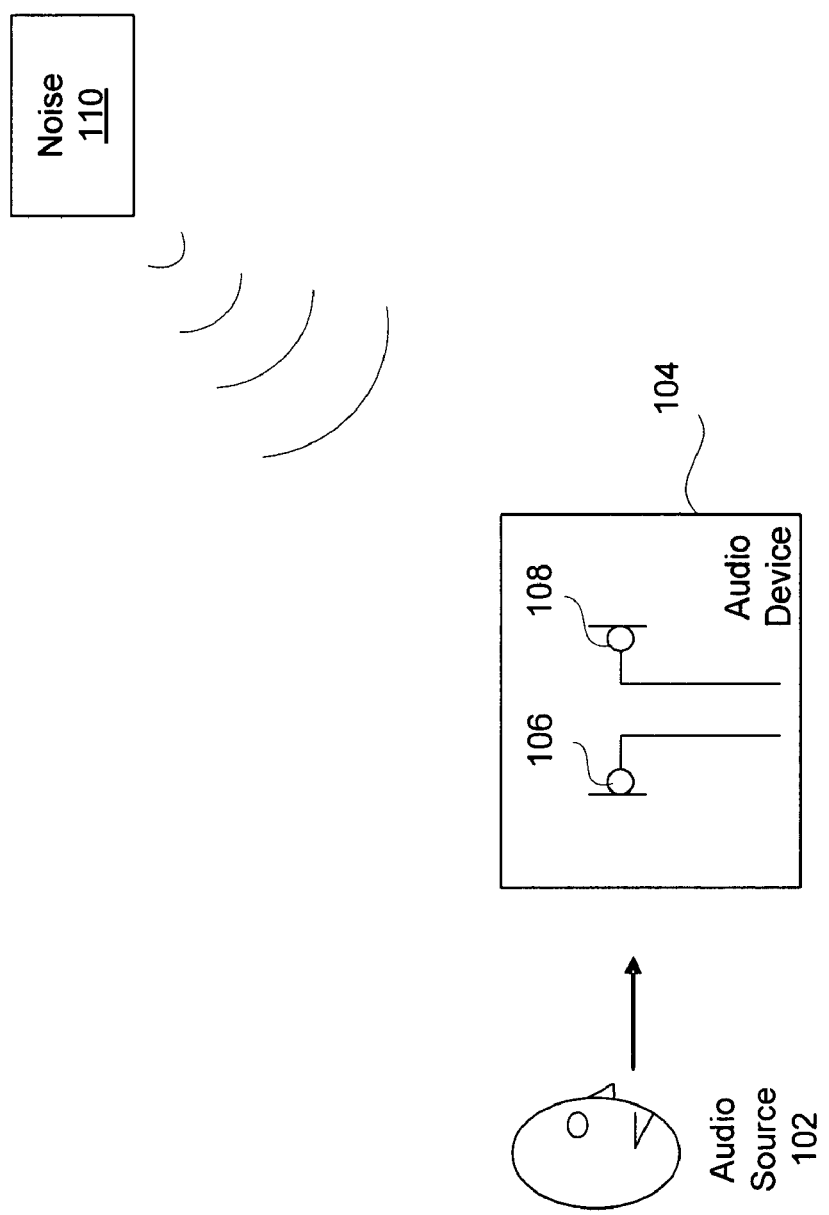
FIG. 1 is an environment in which embodiments of the present invention may be practiced.

Referring to FIG. 1, an environment in which embodiments of the present invention may be practiced is shown. A user acts as audio source 102 to an audio device 104. The exemplary audio device 104 may include a microphone array. The microphone array may comprise a close microphone array or a spread microphone array.

In exemplary embodiments, the microphone array may comprise a primary microphone 106 relative to the audio source 102 and a secondary microphone 108 located a distance away from the primary microphone 106. While embodiments of the present invention will be discussed with regards to having two microphones 106 and 108, alternative embodiments may contemplate any number of microphones or acoustic sensors within the microphone array. In some embodiments, the microphones 106 and 108 may comprise omni-directional microphones.

While the microphones 106 and 108 receive sound (i.e., acoustic signals) from the audio source 102, the microphones 106 and 108 also pick up noise 110. Although the noise 110 is shown coming from a single location in FIG. 1, the noise 110 may comprise any sounds from one or more locations different than the audio source 102, and may include reverberations and echoes. The noise 110 may be stationary, non-stationary, or a combination of both stationary and non-stationary noise.

Figure 2:
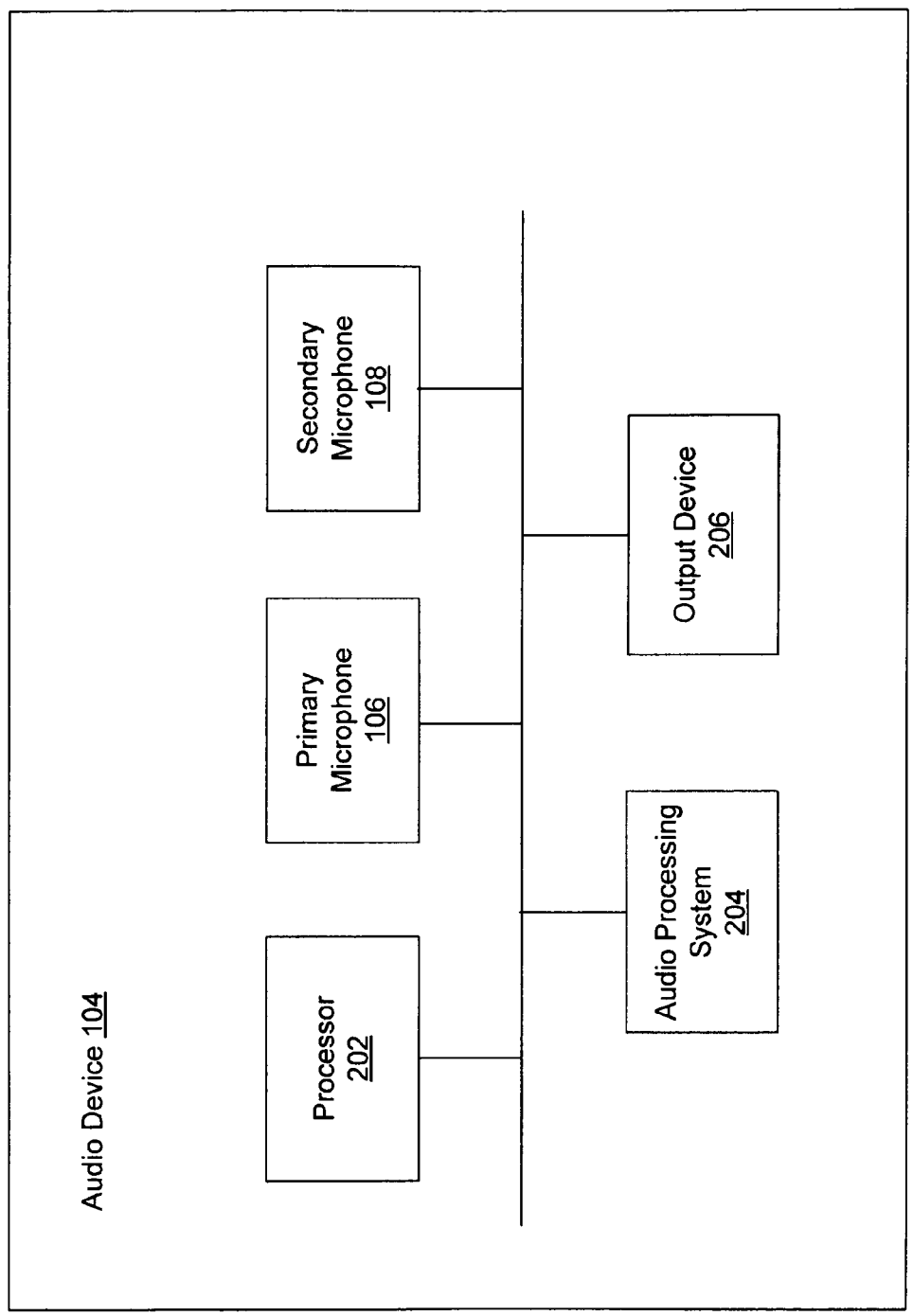
FIG. 2 is a block diagram of an exemplary audio device implementing embodiments of the present invention.

Referring now to FIG. 2, the exemplary audio device 104 is shown in more detail. In exemplary embodiments, the audio device 104 is an audio receiving device that comprises a processor 202, the primary microphone 106, the secondary microphone 108, an audio processing system 204, and an output device 206. The audio device 104 may comprise further components (not shown) necessary for audio device 104 operations. The audio processing system 204 will be discussed in more detail in connection with FIG. 3.

In exemplary embodiments, the primary and secondary microphones 106 and 108 are spaced a distance apart in order to allow for an energy level difference between them. Upon receipt by the microphones 106 and 108, the acoustic signals may be converted into electric signals (i.e., a primary electric signal and a secondary electric signal). The electric signals may, themselves, be converted by an analog-to-digital converter (not shown) into digital signals for processing in accordance with some embodiments. In order to differentiate the acoustic signals, the acoustic signal received by the primary microphone 106 is herein referred to as the primary acoustic signal, while the acoustic signal received by the secondary microphone 108 is herein referred to as the secondary acoustic signal.

The output device 206 is any device which provides an audio output to the user. For example, the output device 206 may comprise an earpiece of a headset or handset, or a speaker on a conferencing device. In some embodiments, the output device 206 may also be a device that outputs or transmits to other users.

Figure 3:
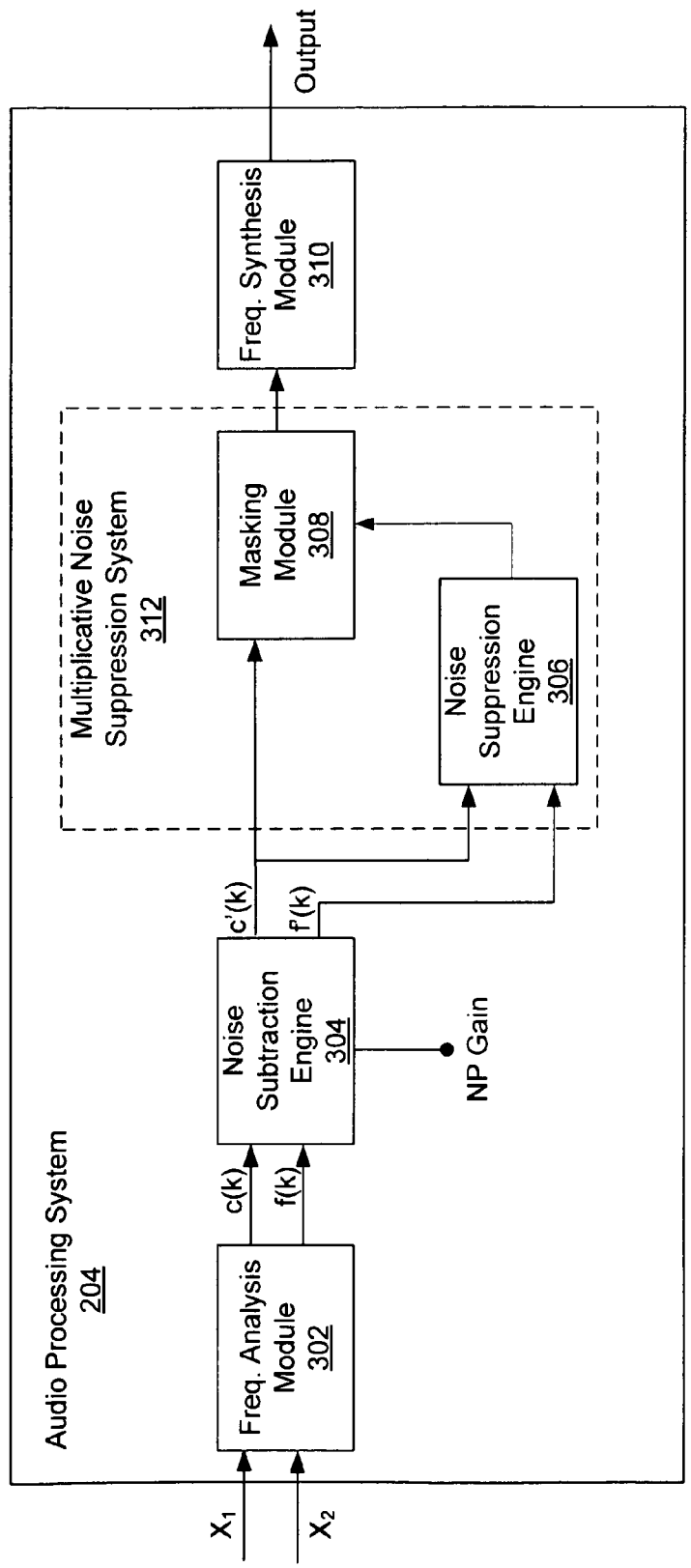
FIG. 3 is a block diagram of an exemplary audio processing system utilizing a spread microphone array.

FIG. 3 is a detailed block diagram of the exemplary audio processing system 204 according to one embodiment of the present invention. In exemplary embodiments, the audio processing system 204 is embodied within a memory device. The audio processing system 204 of FIG. 3 may be utilized in embodiments comprising a spread microphone array.

In operation, the acoustic signals received from the primary and secondary microphones 106 and 108 are converted to electric signals and processed through a frequency analysis module 302. In one embodiment, the frequency analysis module 302 takes the acoustic signals and mimics the frequency analysis of the cochlea (i.e., cochlear domain) simulated by a filter bank. In one example, the frequency analysis module 302 separates the acoustic signals into frequency sub-bands. A sub-band is the result of a filtering operation on an input signal where the bandwidth of the filter is narrower than the bandwidth of the signal received by the frequency analysis module 302. Alternatively, other filters such as short-time Fourier transform (STFT), sub-band filter banks, modulated complex lapped transforms, cochlear models, wavelets, etc., can be used for the frequency analysis and synthesis. Because most sounds (e.g., acoustic signals) are complex and comprise more than one frequency, a sub-band analysis on the acoustic signal determines what individual frequencies are present in the complex acoustic signal during a frame (e.g., a predetermined period of time). According to one embodiment, the frame is 8 ms long. Alternative embodiments may utilize other frame lengths or no frame at all. The results may comprise sub-band signals in a fast cochlea transform (FCT) domain.

Once the sub-band signals are determined, the sub-band signals are forwarded to a noise subtraction engine 304. The exemplary noise subtraction engine 304 is configured to calibrate the audio device by adapting a σ coefficient associated with a position of audio source 102. The σ coefficient adaptation may be selectively performed by the noise subtraction engine 304 for frames determined likely to be dominated by audio from the audio source 102.

In exemplary embodiments, the noise subtraction engine 304 may also prevent audio suppression due to microphone blockage. For example, when the secondary microphone 108 is blocked, an audio system may not be able to differentiate between an audio source and noise in a received audio signal. This results in a low value of σ coefficient, and noise suppression that also reduces the audio source component of the audio signal. To prevent this, the noise subtraction engine 304 may continuously adapt a shadow or copy of the σ coefficient and compare the copy to a threshold associated with the secondary microphone 108.

In exemplary embodiments, the noise subtraction engine 304 may also adaptively subtract out a noise component from the primary acoustic signal for each sub-band. As such, output of the noise subtraction engine 304 is a noise subtracted signal comprised of noise subtracted sub-band signals. The noise subtraction engine 304 will be discussed in more detail in connection with FIG. 5a and FIG. 5b. It should be noted that the noise subtracted sub-band signals may comprise desired audio that is speech or non-speech (e.g., music). The results of the noise subtraction engine 304 may be output to the user or processed through a further noise suppression system (e.g., the noise suppression engine 306). For purposes of illustration, embodiments of the present invention will discuss embodiments whereby the output of the noise subtraction engine 304 is processed through a further noise suppression system.

The noise subtracted sub-band signals along with the sub-band signals of the secondary acoustic signal are then provided to the noise suppression engine 306. According to exemplary embodiments, the noise suppression engine 306 generates a gain mask to be applied to the noise subtracted sub-band signals in order to further reduce noise components that remain in the noise subtracted speech signal. The noise suppression engine 306 will be discussed in more detail in connection with FIG. 4 below.

The gain mask determined by the noise suppression engine 306 may then be applied to the noise subtracted signal in a masking module 308. Accordingly, each gain mask may be applied to an associated noise subtracted frequency sub-band to generate masked frequency sub-bands. As depicted in FIG.

3, an exemplary multiplicative noise suppression system 312 comprises the noise suppression engine 306 and the masking module 308.

Next, the masked frequency sub-bands are converted back into time domain from the cochlea domain. The conversion may comprise taking the masked frequency sub-bands and adding together phase shifted signals of the cochlea channels in a frequency synthesis module 310. Alternatively, the conversion may comprise taking the masked frequency sub-bands and multiplying these with an inverse frequency of the cochlea channels in the frequency synthesis module 310. Once conversion is completed, the synthesized acoustic signal may be output to the user.

Figure 4:
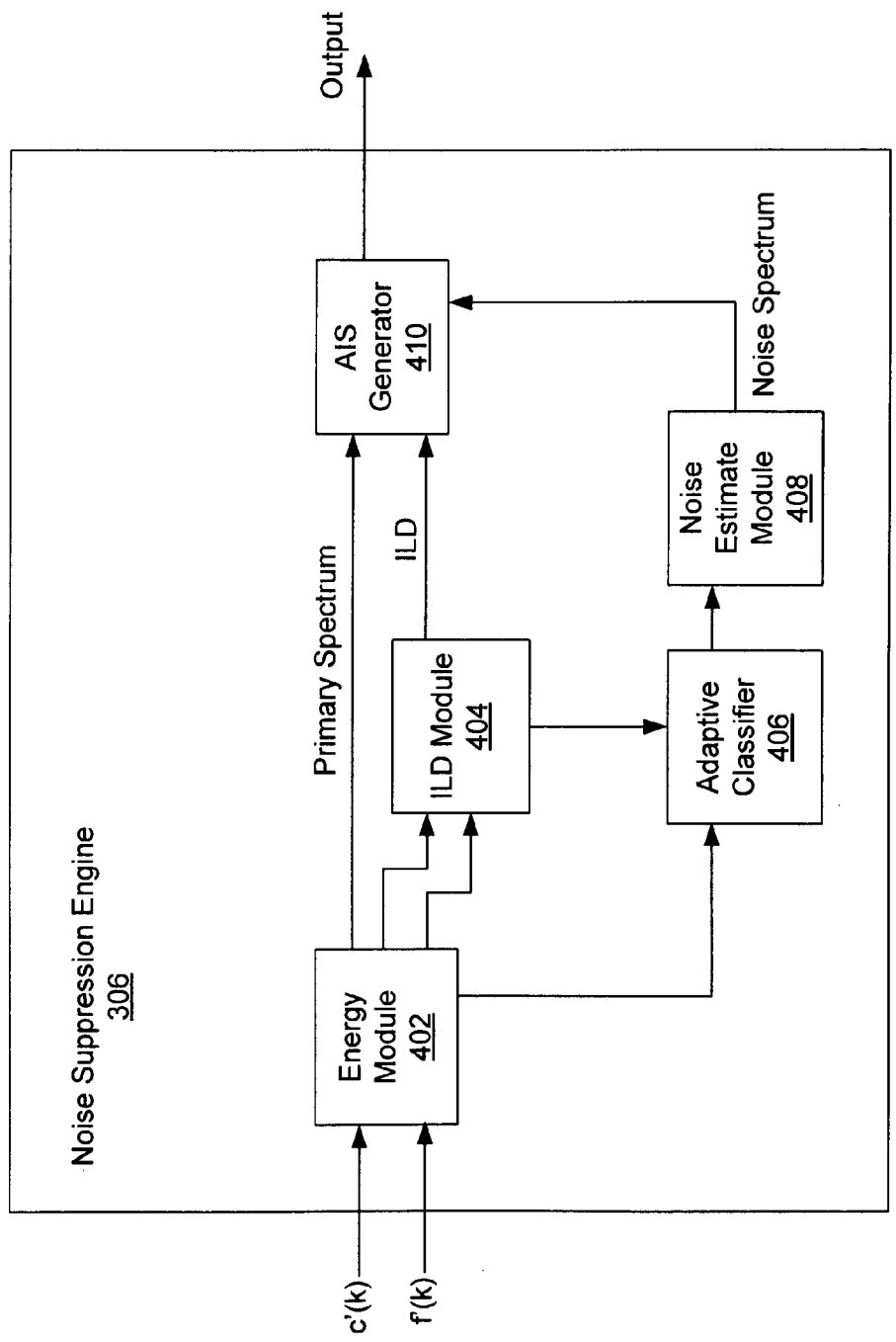
FIG. 4 is a block diagram of an exemplary noise suppression engine.

Referring now to FIG. 4, the noise suppression engine 306 of FIG. 3 is illustrated. The exemplary noise suppression engine 306 comprises an energy module 402, an inter-microphone level difference (ILD) module 404, an adaptive classifier 406, a noise estimate module 408, and an adaptive intelligent suppression (AIS) generator 410. It should be noted that the noise suppression engine 306 is exemplary and may comprise other combinations of modules such as that shown and described in U.S. patent application Ser. No. 11/343,524, which is incorporated by reference.

According to an exemplary embodiment of the present invention, the AIS generator 410 derives time and frequency varying gains or gain masks used by the masking module 308 to suppress noise and enhance speech in the noise subtracted signal. In order to derive the gain masks, however, specific inputs are needed for the AIS generator 410. These inputs comprise a power spectral density of noise (i.e., noise spectrum), a power spectral density of the noise subtracted signal (herein referred to as the primary spectrum), and an inter-microphone level difference (ILD).

According to exemplary embodiment, the noise subtracted signal (c'(k)) resulting from the noise subtraction engine 304 and the secondary acoustic signal (f'(k)) are forwarded to the energy module 402 which computes energy/power estimates during an interval of time for each frequency band (i.e., power estimates) of an acoustic signal. As a result, the primary spectrum (i.e., the power spectral density of the noise subtracted signal) across all frequency bands may be determined by the energy module 402. This primary spectrum may be supplied to the AIS generator 410 and the ILD module 404. Similarly, the energy module 402 determines a secondary spectrum (i.e., the power spectral density of the secondary acoustic signal) across all frequency bands which is also supplied to the ILD module 404. More details regarding the calculation of power estimates and power spectrums can be found in co-pending U.S. patent application Ser. No. 11/343,524 and co-pending U.S. patent application Ser. No. 11/699,732, which are incorporated by reference.

In two microphone embodiments, the power spectrums are used by an inter-microphone level difference (ILD) module 404 to determine an energy ratio between the primary and secondary microphones 106 and 108. In exemplary embodiments, the ILD may be a time and frequency varying ILD. Because the primary and secondary microphones 106 and 108 may be oriented in a particular way, certain level differences may occur when speech is active and other level differences may occur when noise is active. The ILD is then forwarded to the adaptive classifier 406 and the AIS generator 410. More details regarding one embodiment for calculating ILD may be can be found in co-pending U.S. patent application Ser. No. 11/343,524 and co-pending U.S. patent application Ser. No. 11/699,732. In other embodiments, other forms of ILD or energy differences between the primary and secondary microphones 106 and 108 may be utilized. For example, a ratio of the energy of the primary and secondary microphones 106 and 108 may be used. It should also be noted that alternative embodiments may use cues other then ILD for adaptive classification and noise suppression (i.e., gain mask calculation). For example, noise floor thresholds may be used. As such, references to the use of ILD may be construed to be applicable to other cues.

The exemplary adaptive classifier 406 is configured to differentiate noise and distractors (e.g., sources with a negative ILD) from speech in the acoustic signal(s) for each frequency band in each frame. The adaptive classifier 406 is considered adaptive because features (e.g., speech, noise, and distractors) change and are dependent on acoustic conditions in the environment. For example, an ILD that indicates speech in one situation may indicate noise in another situation. Therefore, the adaptive classifier 406 may adjust classification boundaries based on the ILD.

According to exemplary embodiments, the adaptive classifier 406 differentiates noise and distractors from speech and provides the results to the noise estimate module 408 which derives the noise estimate. Initially, the adaptive classifier 406 may determine a maximum energy between channels at each frequency. Local ILDs for each frequency are also determined. A global ILD may be calculated by applying the energy to the local ILDs. Based on the newly calculated global ILD, a running average global ILD and/or a running mean and variance (i.e., global cluster) for ILD observations may be updated. Frame types may then be classified based on a position of the global ILD with respect to the global cluster. The frame types may comprise source, background, and distractors.

Once the frame types are determined, the adaptive classifier 406 may update the global average running mean and variance (i.e., cluster) for the source, background, and distractors. In one example, if the frame is classified as source, background, or distracter, the corresponding global cluster is considered active and is moved toward the global ILD. The global source, background, and distractor global clusters that do not match the frame type are considered inactive. Source and distractor global clusters that remain inactive for a predetermined period of time may move toward the background global cluster. If the background global cluster remains inactive for a predetermined period of time, the background global cluster moves to the global average.

Once the frame types are determined, the adaptive classifier 406 may also update the local average running mean and variance (i.e., cluster) for the source, background, and distractors. The process of updating the local active and inactive clusters is similar to the process of updating the global active and inactive clusters.

Based on the position of the source and background clusters, points in the energy spectrum are classified as source or noise; this result is passed to the noise estimate module 408.

In an alternative embodiment, an example of an adaptive classifier 406 comprises one that tracks a minimum ILD in each frequency band using a minimum statistics estimator. The classification thresholds may be placed a fixed distance (e.g., 3 dB) above the minimum ILD in each band. Alternatively, the thresholds may be placed a variable distance above the minimum ILD in each band, depending on the recently observed range of ILD values observed in each band. For example, if the observed range of ILDs is beyond 6 dB, a threshold may be place such that it is midway between the minimum and maximum ILDs observed in each band over a certain specified period of time (e.g., 2 seconds). The adaptive classifier is further discussed in the U.S. nonprovisional application entitled "System and Method for Adaptive Intelligent Noise Suppression," Ser. No. 11/825,563, filed Jul. 6, 2007, which is incorporated by reference.

In exemplary embodiments, the noise estimate is based on the acoustic signal from the primary microphone 106 and the results from the adaptive classifier 406. The exemplary noise estimate module 408 generates a noise estimate which is a component that can be approximated mathematically by $$N(t,\omega)=\lambda_1(t,\omega)E_1(t,\omega)+(1-\lambda_1(t,\omega))\min[N(t-1,\omega),E_1(t,\omega)]$$

according to one embodiment of the present invention. As shown, the noise estimate in this embodiment is based on minimum statistics of a current energy estimate of the primary acoustic signal, $E_1(t,\omega)$ and a noise estimate of a previous time frame, $N(t-1,\omega)$. As a result, the noise estimation is performed efficiently and with low latency.

$\lambda_1(t,\omega)$ in the above equation may be derived from the ILD approximated by the ILD module 404, as $$\lambda_I(t,\omega) = \begin{cases} \approx 0 & \text{if } ILD(t,\omega) < \text{threshold} \\ \approx 1 & \text{if } ILD(t,\omega) > \text{threshold} \end{cases}.$$

That is, when ILD at the primary microphone 106 is smaller than a threshold value (e.g., threshold=0.5) above which speech is expected to be, $\lambda_1$ is small, and thus the noise estimate module 408 follows the noise closely. When ILD starts to rise (e.g., because speech is present within the large ILD region), $\lambda_1$ increases. As a result, the noise estimate module 408 slows down the noise estimation process and the speech energy does not contribute significantly to the final noise estimate. Alternative embodiments may contemplate other methods for determining the noise estimate or noise spectrum. The noise spectrum (i.e., noise estimates for all frequency bands of an acoustic signal) may then be forwarded to the AIS generator 410.

The AIS generator 410 receives speech energy of the primary spectrum from the energy module 402. This primary spectrum may also comprise some residual noise after processing by the noise subtraction engine 304. The AIS generator 410 may also receive the noise spectrum from the noise estimate module 408. Based on these inputs and an optional ILD from the ILD module 404, a speech spectrum may be inferred. In one embodiment, the speech spectrum is inferred by subtracting the noise estimates of the noise spectrum from the power estimates of the primary spectrum. Subsequently, the AIS generator 410 may determine gain masks to apply to the primary acoustic signal. More detailed discussion of the AIS generator 410 may be found in U.S. patent application Ser. No. 11/825,563 entitled "System and Method for Adaptive Intelligent Noise Suppression," which is incorporated by reference. In exemplary embodiments, the gain mask output from the AIS generator 410, which is time and frequency dependent, will maximize noise suppression while constraining speech loss distortion.

It should be noted that the system architecture of the noise suppression engine 306 is exemplary. Alternative embodiments may comprise more components, less components, or equivalent components and still be within the scope of embodiments of the present invention. Various modules of the noise suppression engine 306 may be combined into a single module. For example, the functionalities of the ILD module 404 may be combined with the functions of the energy module 402.

Embodiments of the present invention may also utilize an alternative audio processing system 204, (e.g., in embodiments comprising a close microphone array) and/or alternative noise suppression engine 306. More information regarding those alternative embodiments may be found in U.S. patent application Ser. No. 12/215,980, which is incorporated herein by reference. More details regarding modules of an alternative audio processing system 204, such as an array processing engine, may be found in U.S. patent application Ser. No. 12/080,115 entitled "System and Method for Providing Close-Microphone Array Noise Reduction," which is also incorporated by reference.

Figure 5B:
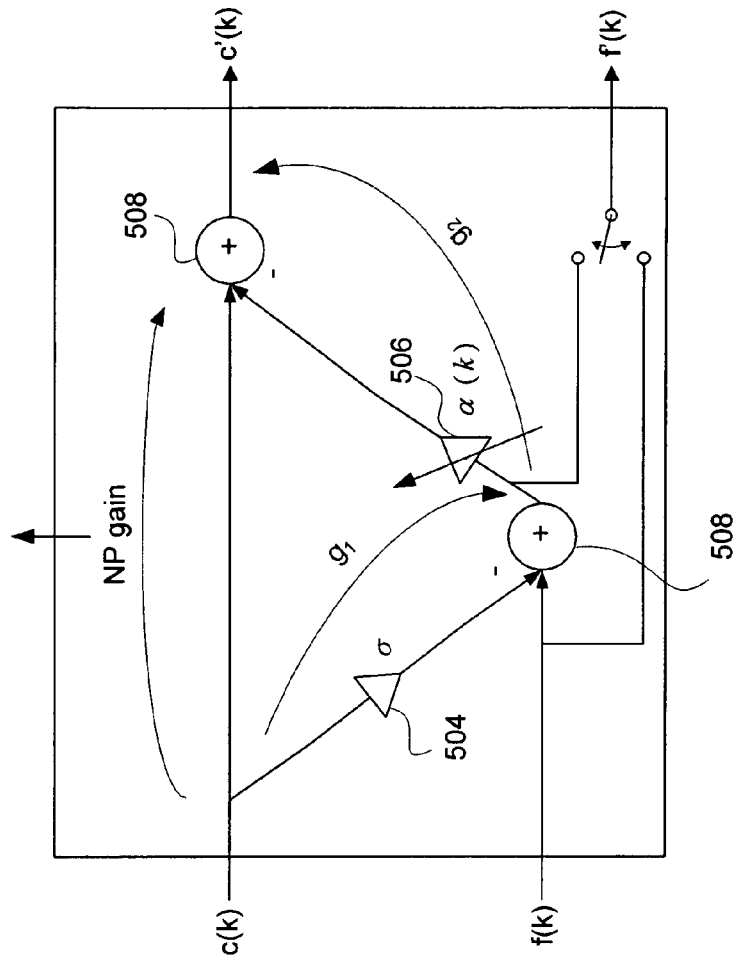
FIG. 5$a$ is a block diagram of an exemplary noise subtraction engine.
Figure 5A:
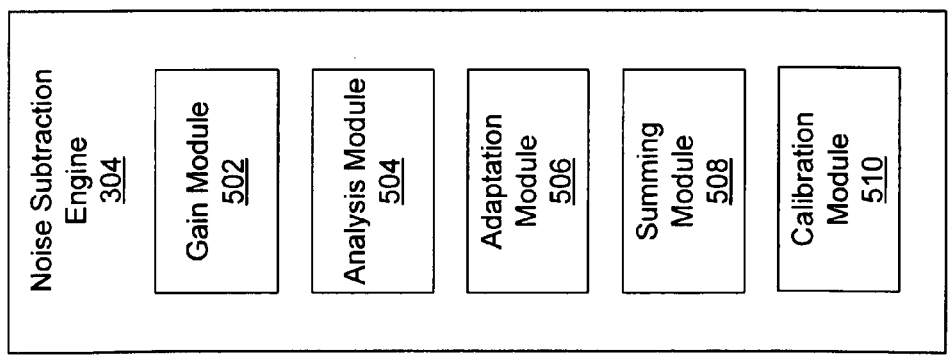

FIG. 5a is a block diagram of an exemplary noise subtraction engine 304. The exemplary noise subtraction engine 304 is configured to suppress noise by calibrating the σ coefficient and determining a noise subtracted signal. In exemplary embodiments, the noise subtraction engine 304 comprises a gain module 502, an analysis module 504, an adaptation module 506, at least one summing module 508 configured to perform signal subtraction, and a calibration module 510. The functions of the various modules 502-510 will be discussed in connection with FIG. 5a and further illustrated in operation in connection with FIG. 5b.

Referring to FIG. 5a, the exemplary gain module 502 is configured to determine various gains used by the noise subtraction engine 304. For purposes of the present embodiment, these gains represent energy ratios. The exemplary analysis module 504 is configured to perform the analysis in the first branch of the noise subtraction engine 304, while the exemplary adaptation module 506 is configured to perform the adaptation in the second branch of the noise subtraction engine 304.

The calibration module 510 is configured to calibrate the σ coefficient associated with a location of the audio source. In exemplary embodiments, the calibration module 510 may determine a signal energy level, coefficient phase, and coefficient magnitude which satisfies one or more sub-band condition thresholds for one or more sub-bands of an audio signal frame. Additionally, the calibration module 510 may determine whether a frame satisfies one or more sub-band thresholds. Operation of the calibration module 510 is discussed in more detail below with respect to FIGS. 7-11.

Referring to FIG. 5b, a schematic illustrating the operations of the noise subtraction engine 304 is shown. Sub-band signals of the primary microphone signal c(k) and secondary microphone signal f(k) are received by the noise subtraction engine 304, where k represents a discrete time or sample index. Primary microphone signal c(k) represents a superposition of a speech signal s(k) and a noise signal n(k). Secondary microphone signal f(k) is modeled as a superposition of the speech signal s(k), scaled by a complex-valued coefficient σ, and the noise signal n(k), scaled by a complex-valued coefficient ν. ν represents how much of the noise in the primary signal is in the secondary signal. In exemplary embodiments, ν is unknown since a source of the noise may be dynamic.

In exemplary embodiments, σ is a fixed coefficient that represents a location of the speech (e.g., an audio source location) and may be adapted as frames of an audio signal are processed. Adapting σ is discussed in more detail below with respect to FIGS. 7-11.

In some embodiments, the σ coefficient is a fixed coefficient which may be determined through calibration. Tolerances may be included in the calibration by calibrating based on more than one position. For a close microphone, a magnitude of a may be close to one. For spread microphones, the magnitude of σ may be dependent on where the audio device 102 is positioned relative to the speaker's mouth. The magnitude and phase of the σ may represent an inter-channel cross-spectrum for a speaker's mouth position at a frequency represented by the respective sub-band (e.g., Cochlea tap). Because the noise subtraction engine 304 may have knowledge of what σ is, the analysis module 504 may apply σ to the primary signal (i.e., σ(s(k)+n(k)) and subtract the result from the secondary signal (i.e., σs(k)+v(k)) in order to cancel out the speech component σ s(k) (i.e., the desired component) from the secondary signal resulting in a noise component out of the summing module 508. In an embodiment where there is no speech, α is approximately 1/(v−σ), and the adaptation module 506 may freely adapt.

If the speaker's mouth position is adequately represented by σ, then f(k)−σc(k)=(v−σ)n(k). This equation indicates that the signal at the output of the summing module 508 being fed into the adaptation module 506 (which, in turn, applies an adaptation coefficient α(k)) may be devoid of a signal originating from a position represented by σ (e.g., the desired speech signal). In exemplary embodiments, the analysis module 504 applies a to the secondary signal f(k) and subtracts the result from c(k). A remaining signal (referred to herein as "noise component signal") from the summing module 508 may be canceled out in the second branch.

The adaptation module 506 may adapt when the primary signal is dominated by audio sources 102 not in the speech location (represented by σ). If the primary signal is dominated by a signal originating from the speech location as represented by σ, adaptation may be frozen. In exemplary embodiments, the adaptation module 506 may adapt using one of a common least-squares method in order to cancel the noise component n(k) from the signal c(k). The σ coefficient may be updated at a frame rate according to one embodiment.

In an embodiment where n(k) is white noise and a cross-correlation between s(k) and n(k) is zero within a frame, adaptation may happen every frame with the noise n(k) being perfectly cancelled and the speech s(k) being perfectly unaffected. However, it is unlikely that these conditions may be met in reality, especially if the frame size is short. As such, it is desirable to apply constraints on adaptation. In exemplary embodiments, the adaptation coefficient α(k) may be updated on a per-tap/per-frame basis when a reference energy ratio $g_1$ and a prediction energy ratio $g_2$ satisfy the follow condition:

$$g_2 \cdot \gamma > g_1 / \gamma$$

where γ>0. Assuming, for example, that $\hat{\sigma}(k)=\sigma$, $\alpha(k)=1/(v-\sigma)$, and s(k) and n(k) are uncorrelated, the following may be obtained:

$$g_1 = \frac{E\{(s(k)+n(k))^2\}}{|v-\sigma|^2 \cdot E\{n^2(k)\}} = \frac{S+N}{|v-\sigma|^2 \cdot N}$$

$$g_2 = \frac{|v-\sigma|^2 \cdot E\{n^2(k)\}}{E\{s^2(k)\}} = |v-\sigma|^2 \cdot \frac{N}{S},$$

and where E{ . . . } is an expected value, S is a signal energy, and N is a noise energy. From the previous three equations, the following may be obtained:

$$SNR^2 + SNR < \gamma^2 |v-\sigma|^4.$$

If the noise is in the same location as the target speech (i.e., σ=v), this condition may not be met, so regardless of the SNR, adaptation may never happen. The further away from the target location the source is, the greater $|v-\sigma|^4$ and the larger the SNR is allowed to be while there is still adaptation attempting to cancel the noise.

In exemplary embodiments, adaptation may occur in frames where more signal is canceled in the second branch as opposed to the first branch. Thus, energies may be calculated after the first branch by the gain module 502 and $g_1$ determined. An energy calculation may also be performed in order to determine $g_2$ which may indicate if α is allowed to adapt. If $\gamma^2|v-\sigma|^4 > SNR^2 + SNR^4$ is true, then adaptation of a may be performed. However, if this equation is not true, then α is not adapted.

The coefficient γ may be chosen to define a boundary between adaptation and non-adaptation of α. In an embodiment, a far-field source may be located at 90 degree angle relative to a straight line between the microphones 106 and 108. In this embodiment, the signal may have equal power and zero phase shift between both microphones 106 and 108 (e.g., v=1). If the SNR=1, then $\gamma^2|v-\sigma|^4=2$, which is equivalent to γ=sqrt(2)/|1−σ|⁴.

Raising γ relative to this value may improve protection of the near-end source from cancellation at the expense of increased noise leakage; lowering γ has an opposite effect. It should be noted that in the microphones 106 and 108, v=1 may not be a good enough approximation of the far-field/90 degrees situation, and may have to substituted by a value obtained from calibration measurements.

Figure 6:
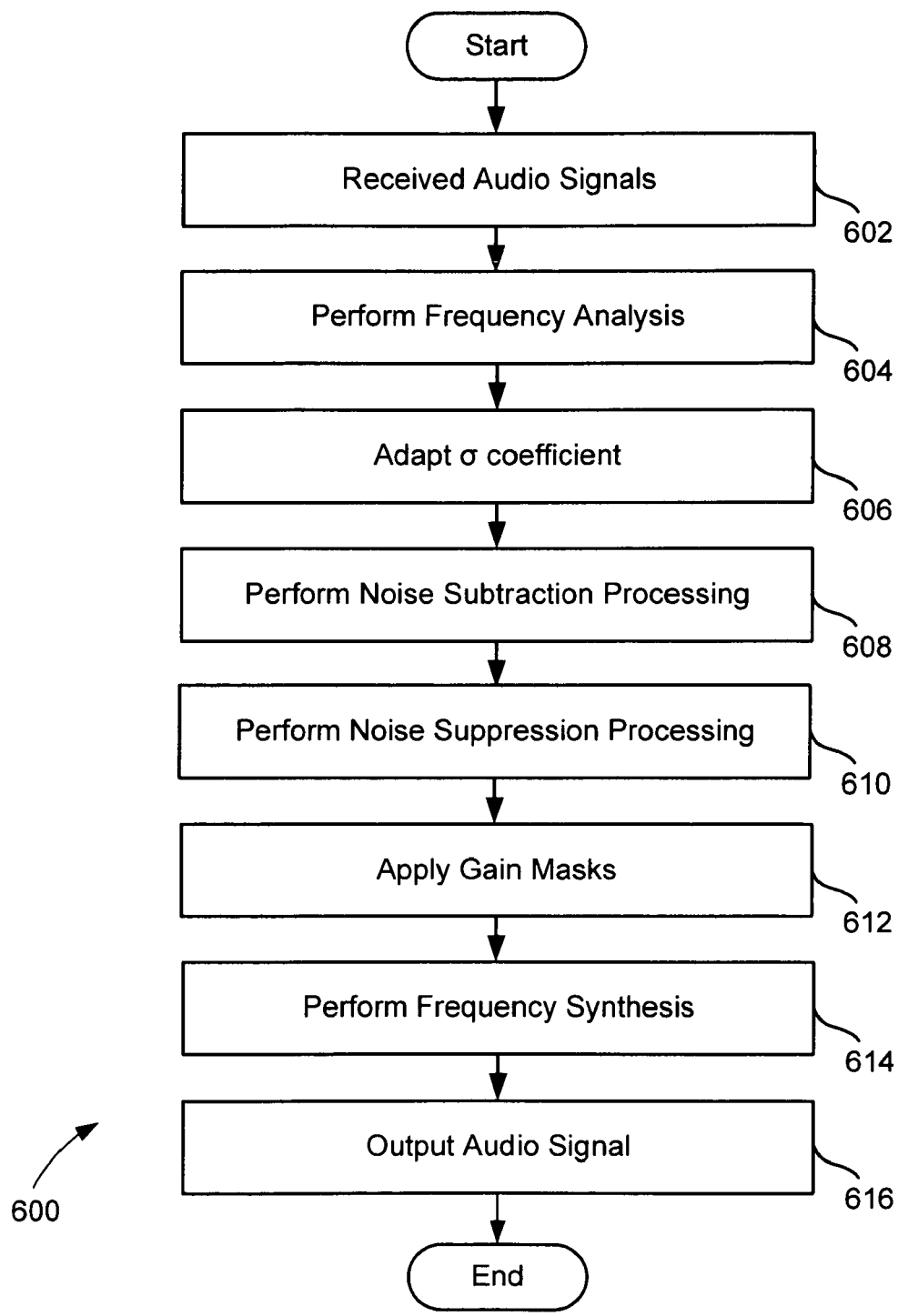
FIG. 6 is a flowchart of an exemplary method for suppressing noise in the audio device.

FIG. 6 is a flowchart 600 of an exemplary method for suppressing noise in the audio device 102. In step 602, audio signals are received by the audio device 102. In exemplary embodiments, a plurality of microphones (e.g., primary and secondary microphones 106 and 108) receive the audio signals (i.e., acoustic signals). The plurality of microphones may comprise a close microphone array or a spread microphone array.

In step 604, the frequency analysis on the primary and secondary acoustic signals may be performed. In one embodiment, the frequency analysis module 302 utilizes a filter bank to determine frequency sub-bands for the primary and secondary acoustic signals.

A σ coefficient is adapted in step 606. Adapting the σ coefficient may involve determining sub-band characteristics and adapting the σ coefficient value based on a number of sub-bands that meet one or more thresholds. Thus, characteristics are determined for each sub-band, and the σ coefficient is determined for each sub-band of a frame being processed. Adapting the σ coefficient may also include protection against secondary microphone blockage by adjusting an σ coefficient when the σ coefficient drops below a threshold value. Adapting of the σ coefficient is discussed in more detail below with respect to FIG. 7.

Noise subtraction processing is performed in step 608. More details of noise subtraction processing are described in U.S. patent application Ser. No. 12/215,980, filed Jun. 30, 2008, entitled "System and Method for Providing Noise Suppression Utilizing Null Processing Noise Subtraction," which is incorporated by reference herein.

Noise suppression processing may then be performed in step 610. In one embodiment, the noise suppression processing may first compute an energy spectrum for the primary or noise subtracted signal and the secondary signal. An energy difference between the two signals may then be determined. Subsequently, the speech and noise components may be adaptively classified according to one embodiment. A noise spectrum may then be determined. In one embodiment, the noise estimate may be based on the noise component. Based on the noise estimate, a gain mask may be adaptively determined.

The gain mask may then be applied in step 612. In one embodiment, the gain mask may be applied by the masking module 308 on a per sub-band signal basis. In some embodiments, the gain mask may be applied to the noise subtracted signal. The sub-bands signals may then be synthesized in step 614 to generate the output. In one embodiment, the sub-band signals may be converted back to the time domain from the frequency domain. Once converted, the audio signal may be output to the user in step 616. The output may be via a speaker, earpiece, or other similar devices.

Figure 7:
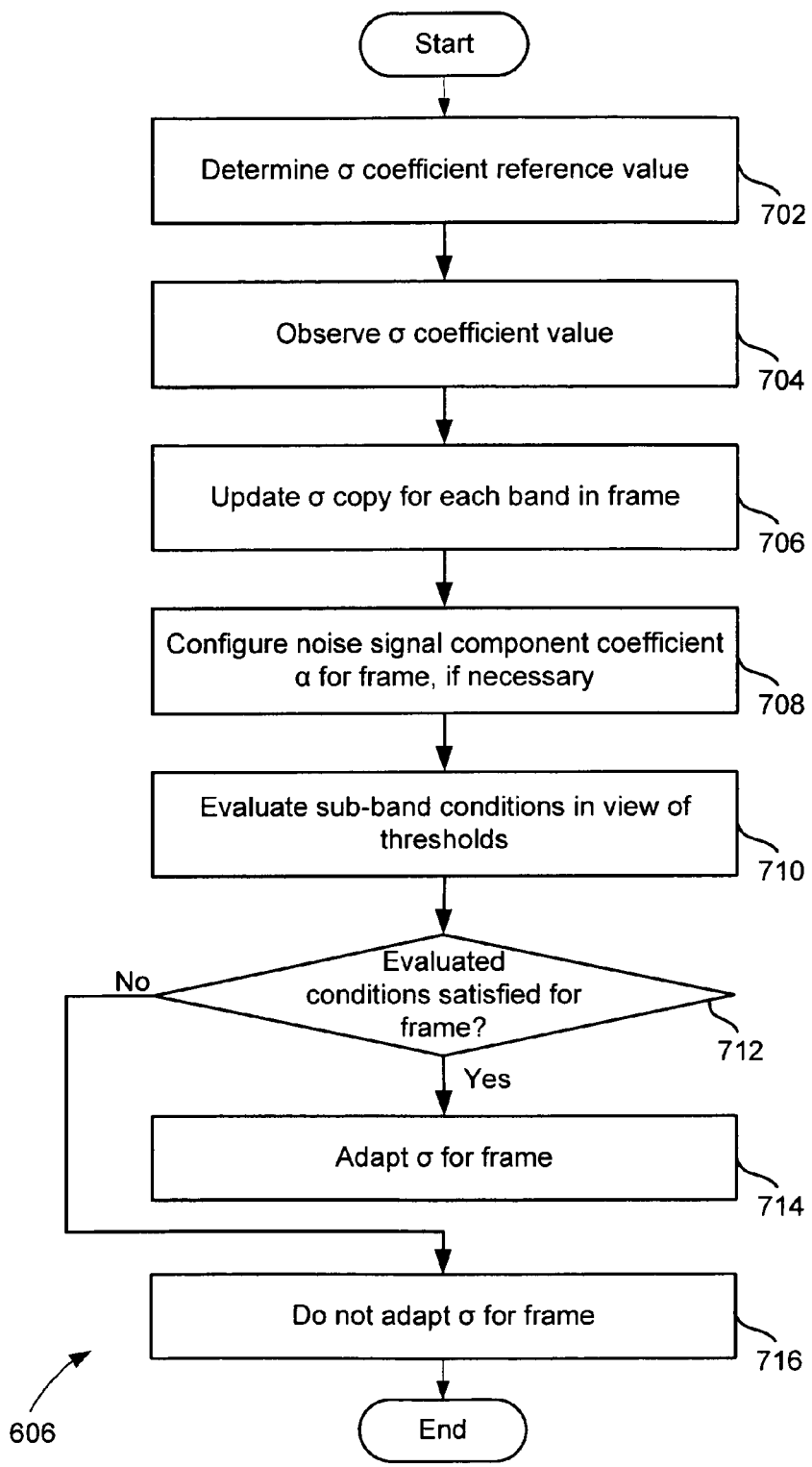
FIG. 7 is a flowchart of an exemplary method for calibrating a coefficient associated with an audio source.

FIG. 7 is a flowchart of an exemplary method for adapting, or calibrating, a coefficient associated with the audio source. In some embodiments, the method of FIG. 7 provides more details for step 606 of the method of FIG. 6. The method of FIG. 7 begins with determining a σ coefficient reference value in step 702. In some embodiments, the σ coefficient reference value is a factory determined value and pre-stored within the audio device 104. In some embodiments, the σ coefficient reference value may be determined through calibration of the audio device 104.

After determining the reference value, a current σ coefficient value is observed in step 704. The current σ coefficient value may be observed during a frame of the audio signal received by the microphones 106 and 108. In some embodiments, the observed σ coefficient value may be determined as a cross correlation between channels divided by an autocorrelation of a single channel. In exemplary embodiments, the observed coefficient is the first order least-squares predictor from one microphone to the other. In exemplary embodiments, the observed σ coefficient value will be a complex value having a magnitude and a phase.

A copy of the σ coefficient is updated for each sub-band in the current frame in step 706. At the first occurrence of step 706, a copy of the reference value for the σ coefficient is created. At subsequent occurrences of step 706, the copy of σ coefficient is updated by adapting the coefficient value towards an observed value. In one embodiment, updating the σ copy coefficient is performed according to the following equation:

$$\sigma_{updatedcopy} = \sigma_{previouscopy} + \lambda(\sigma_{obs} - \sigma_{previouscopy}),$$

where σupdatedcopy is the newly adapted value, $\sigma_{previouscopy}$ is the value of the preexisting copy, $\sigma_{obs}$ is the value of the observed σ coefficient, and λ is some value between, and inclusive of, zero and one (i.e., 0-1). In exemplary embodiments, λ may have a value between 0.1 and 0.9, but other values may be used based on system design and other factors.

After updating the σ coefficient copy, a noise signal component coefficient, or α coefficient, may be configured for the current frame if necessary in step 708. In exemplary embodiments, if the continuously adapted copy of the σ coefficient for a frame falls below a σ coefficient copy threshold value, the audio device processing the frame may not be able to differentiate speech from noise within the frame. As a result, speech may be suppressed along with noise within the frame. To prevent this condition, the α coefficient may be reduced if the σ coefficient for a frame falls below the σ coefficient copy threshold value. Configuring the α coefficient for a frame in step 708 is discussed in more detail below in connection with FIG. 8.

Sub-band conditions are evaluated in view of one or more thresholds in step 710. The sub-band conditions are evaluated to determine if the audio signal is likely to be dominated by the audio source 102 (e.g., a speaker). For example, each sub-band in a frame of the audio signal may be evaluated for one or more of a signal energy, σ coefficient phase, σ coefficient magnitude, and/or other conditions. Additionally, the number of sub-bands that comply with one or more thresholds may also be determined. Evaluating sub-band conditions in view of thresholds is discussed in more detail in connection with FIG. 9 below.

After evaluating sub-band conditions, a determination is made as to whether the evaluated conditions are satisfied for a particular frame in step 712. If the evaluated conditions for the frame are not satisfied, then the σ coefficient is not adapted for the frame in step 716. If the evaluated conditions are satisfied, the current frame is considered likely to be dominated by speech from a source other than noise (e.g., audio source 102) and the σ coefficient value is adapted for the frame in step 714. In one embodiment, the σ coefficient may be adapted according to the following equation:

$$\sigma_{adapted} = \sigma_{previous} + \lambda(\sigma_{obs} - \sigma_{previous}),$$

where $\sigma_{adapted}$ is the newly adapted value, $\sigma_{previous}$ is the value of the previous σ coefficient value, $\sigma_{obs}$ is the value of the observed σ coefficient, and λ is some value equal to or less than 1. In exemplary embodiments, λ may have a value between 0.2 and 0.7, but other values may be used based on system design and other factors.

Figure 8:
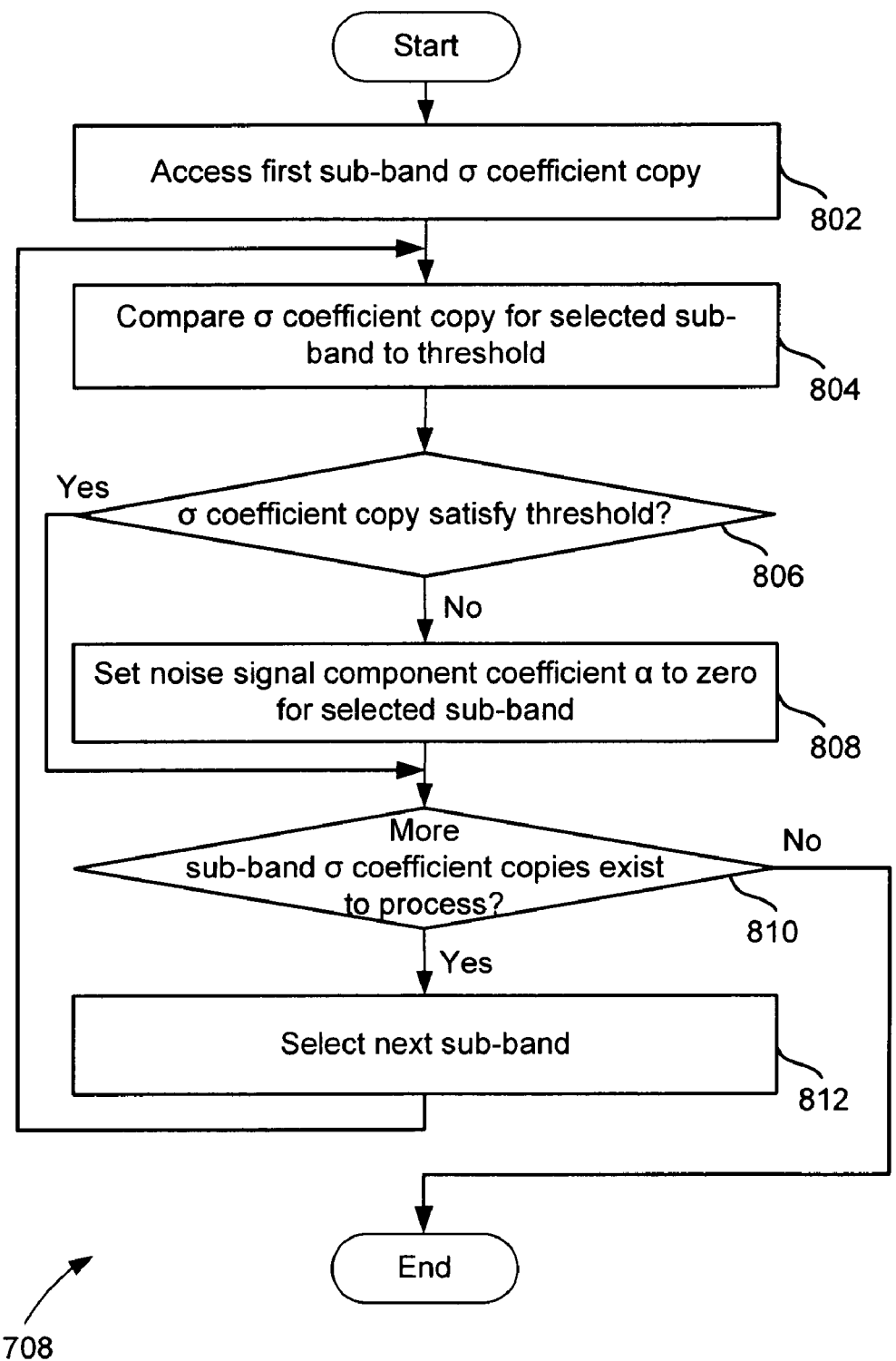
FIG. 8 is a flowchart of an exemplary method for configuring a $\alpha$ coefficient for a frame.

FIG. 8 is a flowchart of an exemplary method for configuring the α coefficient for a frame. In some embodiments, the method of FIG. 8 provides more detail for step 708 of the method of FIG. 7. A first sub-band σ coefficient copy is accessed in step 802. The accessed σ coefficient copy is one of the σ coefficient copies generated in step 706 in the method of FIG. 7. The accessed σ coefficient copy is then compared to a σ coefficient copy threshold in step 804. The σ coefficient copy threshold may be a value that depends on the audio device configuration and/or the handset type. For example, for a handset with two microphones positioned close together, the value of the σ coefficient copy threshold may be 0.2. For a handset with two microphones positioned further apart, the σ coefficient copy threshold may be 0.1 or 0.05.

A determination is then made as to whether the accessed σ coefficient copy satisfies the σ coefficient copy threshold in step 806. If the σ coefficient does satisfy the σ coefficient copy threshold, the method of FIG. 8 continues to step 810. If the σ coefficient does not satisfy the σ coefficient copy threshold, a noise signal component coefficient α is set to zero for the selected sub-band in step 808. Setting the coefficient α to zero effectively blocks the frame sub-bands from being considered as part of the σ coefficient adaptation process and prevents cancelling a speech signal or other desired audio from a current frame in a received signal. After setting the noise signal component coefficient α to zero, the method of FIG. 8 continues to step 810.

At step 810, a determination is made as to whether more sub-band σ coefficient copies exist to be processed. If no further sub-band σ coefficient copies exist to be processed, then the method of FIG. 8 ends. If more sub-band σ coefficient copies exist to be processed, the next sub-band σ coefficient copy is selected in step 812 and the method of FIG. 8 returns to step 804.

Figure 9:
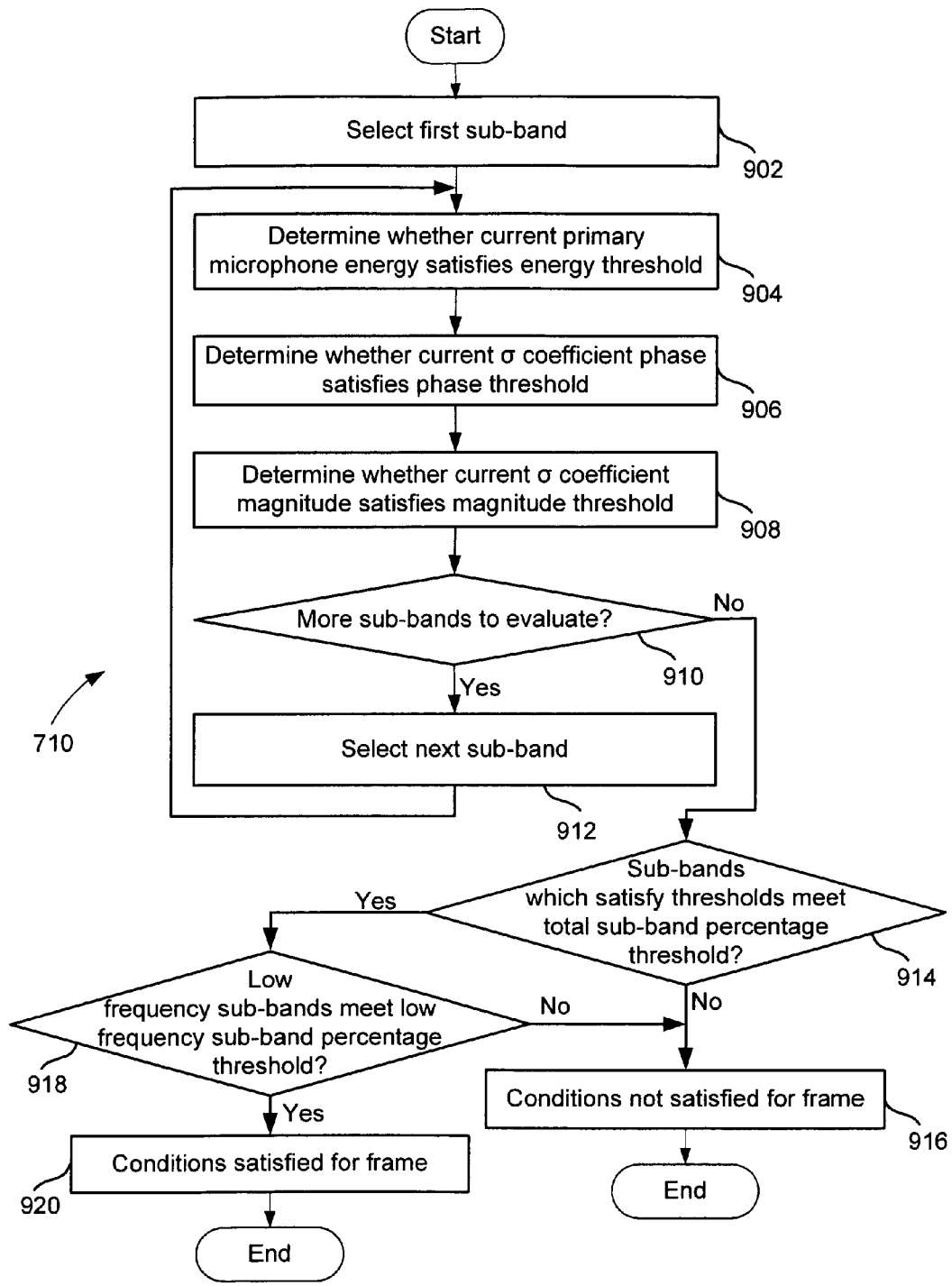
FIG. 9 is a flowchart of an exemplary method for evaluating sub-band conditions.

FIG. 9 is a flowchart of an exemplary method for evaluating sub-band conditions. In some embodiments, the method of FIG. 9 provides more details for step 710 in the method of FIG. 7. A first sub-band of a current frame is selected in step 902. A determination is then made as to whether the current primary microphone energy satisfies an energy threshold for the particular sub-band in step 904. Determining whether current primary microphone energy satisfies an energy threshold is discussed in more detail below with respect to the method of FIG. 10.

A determination is then made as to whether the current σ coefficient phase satisfies a phase threshold in step 906. To determine whether the σ coefficient phase satisfies the phase threshold, a least squares update is computed for the σ coefficient. A reference σ coefficient phase is then accessed. The reference σ coefficient phase may be established as part of a calibration process for the microphone (e.g., microphone 106) or audio device 102. In exemplary embodiments, the reference σ coefficient-phase may be derived from a set of data provided by a manufacturer of the audio device 102 or microphones 106 and/or 108. For example, the manufacturer provided data points may be averaged to generate the reference σ coefficient phase and magnitude. The updated σ coefficient phase and reference σ coefficient phase are then compared to determine if they are within a threshold phase distance from each other. If the phase difference is greater than the threshold phase distance, the phase condition is satisfied. If the phase difference is not greater than the threshold phase distance, the phase condition is not satisfied.

A determination is then made as to whether the current σ coefficient magnitude satisfies a magnitude threshold in step 908. Determining whether a current σ coefficient magnitude satisfies the magnitude threshold is discussed in more detail below with respect to FIG. 11.

Though conditions based on primary microphone energy, σ coefficient phase, and σ coefficient magnitude are specifically mentioned in steps 904-910, these conditions are considered exemplary. Other conditions may be evaluated in addition to, or instead of, those mentioned herein and are considered within the scope of the invention. Furthermore, additional embodiments of the present invention may only require that one or more of the conditions be satisfied, rather than all the conditions, to determine a likelihood of the audio source 102 dominating a frame of the audio signal.

After determining whether one or more of an energy threshold, phase threshold, and/or magnitude threshold are met, a determination is made as to whether there are more frame sub-bands to evaluate in step 910. If more sub-bands should be evaluated, the next sub-band is selected in step 912 and the method of FIG. 9 returns to step 904. If no further sub-bands exist to be evaluated, the method of FIG. 9 continues to step 914.

In exemplary embodiments, a determination is made as to whether the sub-bands which satisfy the threshold determinations of steps 904-908 satisfy a total sub-band percentage threshold in step 914. Hence, in some embodiments, a minimum number of all the sub-bands in a frame must satisfy the determinations of steps 904-908. For example, the total sub-band percentage threshold may be fifty percent, so that at least half of the number of sub-bands must satisfy the thresholds of steps 904-908. In some embodiments, less than all conditions need to be satisfied. If the sub-bands which satisfy the thresholds of steps 904-908 meet the total sub-band percentage threshold, the method of FIG. 9 continues to step 918. If a minimum number of sub-bands do not meet the threshold, a determination is made that conditions are not satisfied for this current frame in step 916 and the method of FIG. 9 ends.

A determination is made in step 918 as to whether a set of low frequency sub-bands meet a low frequency sub-band percentage threshold in step 918. This step is similar to step 914, however only a subset of the sub-bands are analyzed to determine if they satisfied the conditions of steps 904-908. For example, the low frequency sub-band percentage threshold may be sixty percent, and the sub-bands considered for the threshold may be those within a frequency range of 20 Hz to 20 KHz. If the set of low frequency sub-bands does satisfy the low frequency sub-band percentage threshold, the conditions are considered satisfied in step 920 and the method of FIG. 9 ends. If the low frequency sub-bands do not meet the low frequency sub-band percentage threshold, the conditions are considered not satisfied for the current frame in step 916.

Figure 10:
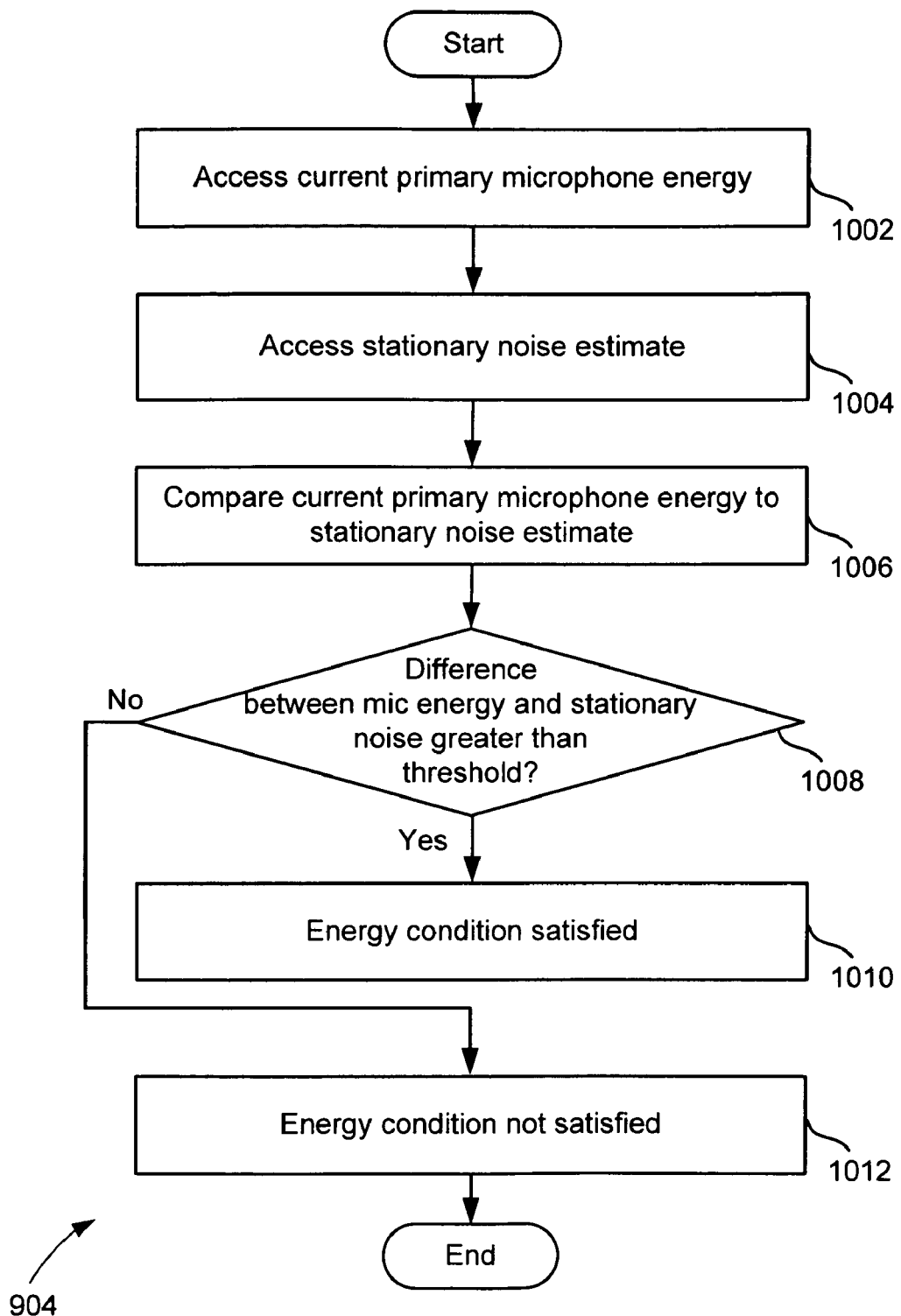
FIG. 10 is a flowchart of an exemplary method for evaluating microphone energy.

FIG. 10 is a flowchart of an exemplary method for evaluating a microphone energy. In some embodiments, the method of FIG. 10 provides more details for step 804 of the method of FIG. 8. First, a current primary microphone energy is accessed in step 1002. The current primary microphone energy may be determined in many ways, such as for example by a squaring or an absolute value method by the energy module 402. After accessing the current primary microphone energy, a stationary noise estimate is accessed in step 1004. The stationary noise estimate may be determined by the noise estimate module 408 and provided to the noise subtraction engine 304, for example as a feedback signal.

The current primary microphone energy is compared to the stationary noise estimate in step 1006. The comparison of the current primary microphone energy to a stationary noise estimate is performed to determine whether the microphone energy is at least a specified distance away from the noise estimate. A determination is then made as to whether the microphone energy is greater than the stationary noise estimate by at least a threshold margin in step 1008. The threshold margin may be any distance chosen by a designer (e.g., 15 dB). If the energy is greater than the noise estimate by at least the desired margin, the energy condition is satisfied in step 1010. If the energy is not greater than the noise estimate, then the energy condition is not satisfied as step 1012.

Figure 11:
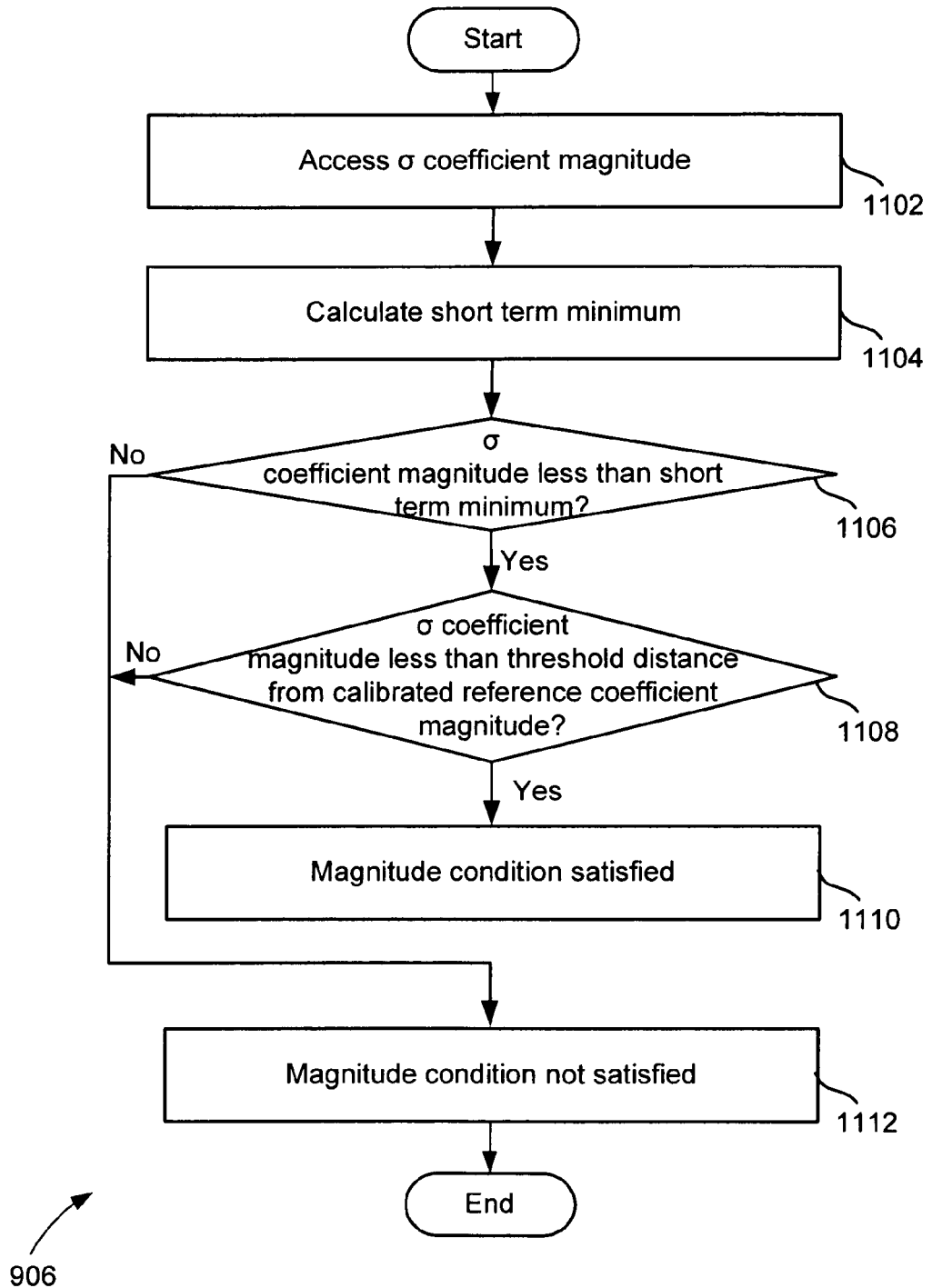
FIG. 11 is a flowchart of an exemplary method for evaluating a phase condition.

FIG. 11 is a flowchart of an exemplary method for evaluating a σ coefficient magnitude condition. In some embodiments, the method of FIG. 11 provides more detail for step 908 for the method of FIG. 9. First, a σ coefficient magnitude for a current frame sub-band is accessed in step 1102. The σ coefficient magnitude may be derived from the audio signal received by the audio device 104.

Next, a short-term minimum is calculated in step 1104. In exemplary embodiments, the short term minimum may be estimated by the noise suppression engine 306 using a leaky integrator. In exemplary embodiments, the leaky integrator has an input of a current observation of abs(σ) (i.e., the absolute value of σ) if it is smaller than a current short term minimum. Otherwise, the input is an upper sigma magnitude limit. A determination is then made as to whether the σ coefficient is less than the short-term minimum in step 1106. If the coefficient is greater than the short-term minimum, then the magnitude condition is not satisfied in step 1112.

If the coefficient is less than the short-term minimum, a determination is made as to whether the σ coefficient is less than a threshold distance from a calibrated reference coefficient magnitude in step 1108. The calibrated reference coefficient magnitude may be determined during calibration. If the coefficient is less than the threshold distance in step 1108, the magnitude condition has been satisfied in step 1110. If the coefficient is not less than the threshold, the magnitude condition is determined not to be satisfied in step 1112.

The above-described modules may be comprised of instructions that are stored in storage media such as a machine readable medium (e.g., a computer readable medium). The instructions may be retrieved and executed by the processor 202. Some examples of instructions include software, program code, and firmware. Some examples of storage media comprise memory devices and integrated circuits. The instructions are operational when executed by the processor 202 to direct the processor 202 to operate in accordance with embodiments of the present invention. Those skilled in the art are familiar with instructions, processors, and storage media.

The present invention is described above with reference to exemplary embodiments. It will be apparent to those skilled in the art that various modifications may be made and other embodiments may be used without departing from the broader scope of the present invention. For example, the microphone array discussed herein comprises a primary and secondary microphone 106 and 108. However, alternative embodiments may contemplate utilizing more microphones in the microphone array. Therefore, there and other variations upon the exemplary embodiments are intended to be covered by the present invention.

What is claimed is:

1. A method for suppressing noise, comprising:
   receiving at least a primary and a secondary acoustic signal associated with an audio source;

determining an observed coefficient value and a reference coefficient value for a coefficient representing a location of the audio source;

determining whether the observed coefficient value satisfies a first threshold;

adapting the reference coefficient value towards the observed coefficient value based on whether the observed coefficient value satisfies the first threshold; and suppressing noise in the primary signal based on the adapted reference coefficient value.

2. The method of claim 1, wherein determining whether the observed coefficient value satisfies a first threshold is performed for each of one or more sub-bands of the primary acoustic signal.

3. The method of claim 1, further comprising determining a number of sub-bands for which the first threshold is satisfied, wherein adapting the reference coefficient value includes adapting the reference coefficient value towards the observed coefficient value based on the number of sub-bands for which the first threshold is satisfied.

4. The method of claim 3, wherein adapting the reference coefficient value includes determining if the number of sub-bands for which the first threshold is satisfied satisfies a first percentage of the total number of sub-bands.

5. The method of claim 3, wherein adapting the reference coefficient value includes determining if the number of sub-bands for which the first threshold is satisfied satisfies a second designated percentage of the total number of sub-bands.

6. The method of claim 1, wherein the first threshold is a signal energy threshold.

7. The method of claim 1, wherein the first threshold is a phase threshold for the observed coefficient.

8. The method of claim 1, wherein the first threshold is a magnitude threshold for the observed coefficient.

9. The method of claim 1, further comprising:

determining whether the observed coefficient value satisfies a signal energy threshold; and determining whether the observed coefficient value satisfies a phase threshold for the observed coefficient.

10. The method of claim 1, further comprising:

adapting a second reference coefficient value towards the observed coefficient value for each observed frame of a plurality of frames of the primary acoustic signal; and setting a noise signal component coefficient to zero based on whether the second reference coefficient value exceeds a second threshold.

11. The method of claim 1, wherein determining the observed coefficient value includes deriving an observed coefficient value from the primary and the secondary acoustic signal.

12. The method of claim 1, further comprising comparing one or more coefficient parameters for the observed coefficient value to one or more coefficient thresholds.

13. The method of claim 1, further comprising:

generating a copy of the reference coefficient value;

automatically adapting the copy of the reference coefficient value towards the observed coefficient value for one or more frames of a primary acoustic signal;

determining if the automatically adapted reference coefficient exceeds a threshold; and reducing a noise signal component coefficient based on whether or not the threshold was exceeded.

14. A system for suppressing noise, comprising:

a microphone array configured to receive at least a primary and a secondary acoustic signal associated with an audio source;

a self calibration module configured to determine an observed coefficient value and a reference coefficient value for a coefficient representing a location of the audio source and to determine whether the observed coefficient value satisfies a first threshold; and an adaptation module configured to adapt the reference coefficient value towards the observed coefficient value based on whether the observed coefficient value satisfies one or more coefficient thresholds, wherein noise in the primary signal is suppressed based on the adapted reference coefficient value.

15. The system of claim 14, wherein the self calibration module is configured to determine whether a magnitude and a phase of the coefficient satisfy the one or more coefficient thresholds.

16. The system of claim 14, wherein the self calibration module is configured to determine if the one or more coefficient thresholds are satisfied for one or more sub-bands of the primary acoustic signal.

17. The system of claim 16, wherein the self calibration module is configured to determine if a number of sub-bands for which the coefficient thresholds are satisfied exceeds a first minimum percentage.

18. The system of claim 17, wherein the self calibration module is configured to determine if a number of lower frequency sub-bands for which the coefficient thresholds are satisfied exceeds a second minimum percentage, the second minimum percentage being higher than the first minimum percentage.

19. A non-transitory machine readable medium having embodied thereon a program executed by a processor, the program providing instructions for a method for suppressing noise using noise subtraction processing, the method comprising:

receiving at least a primary and a secondary acoustic signal associated with an audio source;

determining a first coefficient value and a second coefficient value for a coefficient representing a location of the audio source;

determining whether the first coefficient value satisfies a first threshold;

adapting the second coefficient value towards the first coefficient value based on whether the first coefficient value satisfies the first threshold; and suppressing noise in the primary signal based on the adapted second coefficient value.

20. The non-transitory machine readable medium of claim 19, wherein the first threshold is a magnitude threshold for the observed coefficient, the method further comprising:

determining a number of sub-bands of the primary acoustic signal for which the first threshold is satisfied;

determining whether the observed coefficient value satisfies a signal energy threshold; and determining whether the observed coefficient value satisfies a phase threshold for the observed coefficient.

* * * * *